United States Patent
Zhang et al.

(10) Patent No.: US 8,385,217 B2
(45) Date of Patent: Feb. 26, 2013

(54) METHOD FOR CONFIGURING CHANNEL AND CARRIER RESOURCES FOR MULTI-CARRIER HIGH SPEED DOWNLINK PACKET ACCESS

(75) Inventors: Yincheng Zhang, Guangdong (CN); Zijiang Ma, Guangdong (CN); Xuejun Yang, Guangdong (CN); Zhifeng Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 1276 days.

(21) Appl. No.: 12/093,993

(22) PCT Filed: Nov. 16, 2006

(86) PCT No.: PCT/CN2006/003089
§ 371 (c)(1),
(2), (4) Date: May 16, 2008

(87) PCT Pub. No.: WO2007/056953
PCT Pub. Date: May 24, 2007

(65) Prior Publication Data
US 2008/0259863 A1    Oct. 23, 2008

(30) Foreign Application Priority Data

Nov. 16, 2005  (CN) .......................... 2005 1 0125206
Mar. 30, 2006  (CN) .......................... 2006 1 0011597
Jun. 21, 2006  (CN) .......................... 2006 1 0089340

(51) Int. Cl.
*H04W 72/04*   (2009.01)

(52) U.S. Cl. ........ 370/252; 370/254; 370/329; 455/450; 455/509

(58) Field of Classification Search .................. 370/252, 370/254, 328–333, 337, 347, 431, 464, 465; 455/450, 452.2, 509
See application file for complete search history.

(56) References Cited

U.S. PATENT DOCUMENTS

| | | | |
|---|---|---|---|
| 7,583,629 B2 * | 9/2009 | Lee et al. | 370/329 |
| 7,633,899 B2 * | 12/2009 | Choi et al. | 370/329 |
| 2003/0108027 A1 | 6/2003 | Kim et al. | |
| 2005/0171984 A1 * | 8/2005 | Wang et al. | 708/100 |
| 2007/0109986 A1 * | 5/2007 | Kwak et al. | 370/316 |

FOREIGN PATENT DOCUMENTS

| | | |
|---|---|---|
| CN | 1427636 A | 7/2003 |
| EP | 1549098 A2 | 6/2005 |
| WO | 2005079095 A1 | 8/2005 |

* cited by examiner

*Primary Examiner* — Yemane Mesfin
*Assistant Examiner* — Mon Cheri Davenport
(74) *Attorney, Agent, or Firm* — Christopher L. Parmelee; Walker & Jocke

(57) ABSTRACT

A channel for multicarrier high speed downlink packet access and a method for allocating the carrier resource include: the wireless network controller configures the multicarrier high speed downlink packet access resource of a multicarrier cell, the multicarrier high speed downlink packet access resource includes the high speed physical downlink shared channel resource, the high speed shared control channel and the high speed shared information channel pair resource. The resource is managed and allocated by the node B. The wireless network controller allocates the associated—dedicated physical channel according to the recorded original configuration information and original allocation information of each carrier, and sends the configuration information to the node B, then the node B allocates the high speed physical downlink shared channel carrier resource, the associated high speed shared control channel and the high speed shared information channel pair resource.

37 Claims, 23 Drawing Sheets

The real line frame represents the configured channels and carriers (except the dedicated channel carriers)

The dashed frame represents the configured channels and carriers (except the dedicated channel carriers)

The double-point lineation frame represents the carriers at which the HSDPA resources being not configured

METHOD FOR CONFIGURING CHANNEL AND CARRIER RESOURCES FOR MULTI-CARRIER HIGH SPEED DOWNLINK PACKET ACCESS

FIELD OF THE INVENTION

The present invention relates to the radio communication field, more specifically, relates to a method for configuring channel and carrier resources for multi-carrier High Speed Downlink Packet Access (HSDPA), for example a method for achieving the technology of multi-carrier high speed downlink packet access in the Time Division Synchronization Code Division Multiple Access (TD-SCDMA) system.

DESCRIPTION OF THE RELATED ART

One of the significant characteristics of the $3^{rd}$ Generation mobile communication system is the imbalance of service quantity of uplink and downlink and the service quantity of downlink will be prevailingly more than that of uplink. Aiming at this demand, the characteristic of HSDPA (High Speed Downlink Packet Access) is introduced into the 3G criterion of the 3GPP ($3^{rd}$ Generation Partnership Project).

In the characteristic of HSDPA, technologies of AMC (Adaptive Modulation and Coding), HARQ (Hybrid Automatic Retransmission Request) and associated technologies of reducing the time delay of network processing are introduced to provide a higher downlink packet service speed and improve efficiency of frequency spectrum.

The AMC technology determines the capacity of the present channel according to the condition of the channel (Channel State Information CSI), and determines the appropriate code modulation etc. according to the capacity so as to send maximum information and realize a higher speed. Moreover, to the change of channel quality of each user, the AMC can provide a correspondingly changeable code modulation solution to improve the transmission speed and efficiency of frequency spectrum.

The HARQ is an error correct method combining the traditional ARQ (Automatic Retransmission Request) technology with FEC (Forward Error Correct) technology. The code sent by the transmission port can not only detect errors but also has the ability of correct them. After receiving the information, the receiving end will automatically correct errors, if the condition of errors is within the ability of error correct. If the condition of errors goes beyond the ability of error correct of the error correct code but can be detected, the receiving end will feed back corresponding signal to the sending end to resend the code.

In the HSDPA technology, sublayers of the HS-DSCH (High Speed Downlink Shared Channel) and MAC-hs (Media Access Control-high speed) are new introduced. An MAC-hs in the network side is realized on a Node B for data transmission of the HS-DSCH transmission channel. In the Node B, each cell has an MAC-hs entity, and the MAC-hs not only completes data processing and dispatching but is also in charge of management of managing and configuring of the HSDPA physical resources. The MAC-hs comprises function entities such as traffic control, dispatch/priority control, HARQ function, TFRC choice (Transport Format and Resource Choice) and etc. In the MAC-hs entity of the Node B side, each UE corresponds to an HARQ entity and implements the N-Channel SAW (See and Wait) Protocol, i.e. the HARQ entity implements N-Channel-SAW-HAEQ protocol. An HARQ entity corresponds to a plurality of the HARQ processes. In the present 3GPP protocol on TD-SCDMA, HARQ entities of a UE can at most comprise 8 HARQ processes. Different HARQ processes are identified by process ID. One HS-DSCH TTI corresponds to the one HARQ process. In the UE side, one UE has one MAC-hs entity comprising function entities such as the HARQ function, distributing, re-ordering and disassembly. The HARQ entity therein and that in the Node B are peer entities comprising the HARQ processes of the same number, each of which and the processes in the Node B side form protocol entities which correspond to each other one to one by the process ID to receive the MAC-hs PDU (protocol data unit) data package. If the receiver receives the data correctly, an ACK signal is fed back in the uplink HS-SICH channel (high speed shared information channel), and the HARQ process in the Node B side releases the data package, contrarily, if the data is not received correctly, the data is buffered, an NAK signal is fed back by the HS-SICH, and the process in transmission port re-sends the data package, i.e. the HARQ entity processes the MAC-hs PDU data package retransmission according to the process.

In the HSDPA technology of the TD-SCDMA system, the new introduced HS-DSCH transmission channel is mapped to the new introduced HS-PDSCH (High Speed Physical Downlink Shared Channel). The HS-PDSCH channel is shared by a plurality of users in a cell in a time division or code division manner. The TTI (Transmission Time Interval) of the HS-PDSCH is 5 ms. The HS-PDSCH carries service data of users, while associated control information for the HS-PDSCH receiving is transmitted by the new introduced associated HS-SCCH (high speed shared control channel), and the HS-SICH serves to transmit the uplink feedback information. Therefore, the three physical channels constitute a physical layer closed loop, which conduct processing and transmission in the unit of TTI of 5 ms. This shorter TTI can be better adapted to the time varying characteristic of radio links. The control information carried in the HS-SCCH channel comprises: HARQ Process ID, redundant versions, new data identification, HS-SCCH circle sequence numbers HCSN, UE ID, modulation form MF, transmission block size identification and physical channel resource. The feedback information carried in the HS-SICH channel comprises: recommended modulation form RMF, recommended transmission block size RTBS and acknowledgement information ACK/NAK acknowledging whether the data is correctly transferred or not. Additionally, for the transmission of an RRC signaling, the associated dedicated physical channel of uplinks and downlinks in R5 are also defined by 3GPP to carry the RRC signaling associated with the HSDPA.

According to the present 3GPP protocol, in the TD-SCDMA system, the cell and the carrier corresponds to each other one to one, the configuration method of the channel resources associated with the HSDPA in the single carrier cell is: one HS-DSCH, a plurality of HS-SCCHs, and HS-SICHs which correspond to HS-SCCH by one to one. When one UE configures the HS-DSCH resources in the network side, 1-4 HS-SCCHs are configured, which compose one HS-SCCH set, and meanwhile the HS-SCCHs corresponding to each HS-SCCH one to one are configured. In the process of sending HS-DSCH data, in each HS-DSCH TTI, a Node B sends a control channel associated with the HS-DSCH in an HS-SCCH channel. The UE obtains these information by reading the channel and sends feedback information in an HS-SICH channel corresponding to the HS-SCCH. In the Node B side, in each HS-DSCH TTI, for a certain UE, an HS-SCCH selected by the MAC-hs is provided for the UE to use, i.e. a control channel associated with the HS-DSCH is sent for the UE in the HS-SCCH. In the UE side, if the HS-SCCH set does not have an HS-SCCH configured for the UE to use, the UE continuously monitors this HS-SCCH set and searches the HS-SCCH actually configured for the UE therein, until an HS-SCCH channel configured for the UE is found by comparing the "UE identification" information read in the HS-SCCH with the identification of the UE itself, then the next TTI begins. Only the HS-SCCH is monitored and received, the HS-DSCH data is received by using the control information it carries, and the feedback information is sent in a HS-SICH channel corresponding to the HS-SCCH, until in a certain TTI, the UE can not read a UE identification matching itself in the HS-SCCH or can not read the HS-SCCH, and the UE will monitor the configured HS-SCCH set once again, until it finds the HS-SCCH configured for the UE.

The description above is the HSPDA technology in the TD-SCDMA system in the present 3GPP protocol. The TD-SCDMA system in the present 3GPP protocol is a single carrier system, i.e. one cell corresponds to one carrier, the spectral bandwidth of a single carrier is 1.6M. As a relatively narrow band TDD form is adopted by TD-SCDMA, the theoretical peak value of the speed at a single carrier can reach 2.8 Mbps. The downlink peak value of the speed provided at a single carrier is low, which can not well satisfy the demand of operators on the high speed packet data service in the future. Therefore, some technical improvements based at the single carrier cell HSDPA technology are needed to satisfy a higher demand of operators on the high speed packet data service. Adopting the multi-carrier HSDPA technology is a very good method. The multi-carrier HSDPA allows that the data package of HSDPA of one user can be transmitted at a plurality of carriers at the same time, the Node B can send them at a plurality of carriers at the same time, and a UE can receive data of the HSDPA at a plurality of carriers. As a single carrier can provide a peak value of service speed of 2.8 Mbps, in the multi-carrier condition, the service speed of a single user can be greatly increased. Theoretically, N carriers working at the same time can provide users with a service as high as N*2.8 Mbps.

In the multi-carrier HSDPA system, the system sets up a multi-carrier cell and configures the above HSDPA physical channel resources at the multi-carrier. In the network side, an MAC-hs processing entity is set up to manage the HS-PDSCH channel resources and the plural pairs of HS-SCCH and HS-SICH resources at the above plural carriers. When the HSDPA resources are initially configured for the user equipment, one or plural carrier resources are configured for the user equipment by the MAC-hs and one or plural pairs of HS-SCCH and HS-SICH physical channel pair resources are configured for the each carrier to be associated, which are called HS-SCCH subset. In the process of sending data, the MAC-hs entity on the Node B in the network side selects concrete HS-PDSCH physical channels at one or plural carriers of the above configured one or plural carriers for the user equipment. For the selected each carrier, one pair is selected from plural configured pairs of HS-SCCH and HS-SICH physical channels associated with the carrier to carry the configuration control information associated with the HS-PDSCH physical channel at the carrier and receive the feedback information.

In the TD-SCDMA multi-carrier HSDPA technology, in addition to the HS-SCCH and HS-SICH physical channel associated with the HS-PSDCH, the associated dedicated physical channel of uplink and downlink are also defined and configured to carry the RRC signaling information. However, compared with the HSPDA of a single carrier technology of the TD-SCDMA system in the present 3GPP protocol, as in the TD-SCDMA multi-carrier HSDPA technology, the physical channel resources at different carriers can be configured for one UE, the configuration method in the single carrier condition can not be used in the configuration (allocation) of the HS-PDSCH physical channel, the HS-SCCH and HS-SICH physical channel pair, and the associated dedicated physical channel of uplink and downlink in the multi-carrier HSDPA technology. Therefore, a channel configuration (allocation) method adapted in the multi-carrier high speed downlink packet access technology must be provided. Meanwhile, for the HS-PSDCH and the associated HS-SCCH and HS-SICH physical channel at a plurality of carriers, a carrier resources configuration and dispatching method is necessary to increase the utilization efficiency and system capacity of the multi-carrier HS-PDSCH physical channel. For the configuration process of the initial carrier resources therein, a corresponding configuration method is also required.

All in all, in the above associated technologies, for the multi-carrier high speed downlink packet access, there is not provided a suitable configuration method of the channel and carrier resources. Therefore, a method for configuring the channel and carrier resources adapted in the multi-carrier high speed downlink packet access technology must be provided.

SUMMARY OF THE INVENTION

The object of the present invention is to provide a method for configuring channels and carrier resources adapted in the multi-carrier high speed downlink packet access to solve the problem of lacking associated methods in the above associated technologies.

To solve the above problem, according to one aspect of the present invention, the present invention provides a method for configuring channel resources adapted in the multi-carrier high speed downlink packet access, comprising the following steps:

A radio network controller configures high speed physical downlink shared channel resources at one or plural carriers in a multi-carrier cell and only configures one or plural high speed shared control channel and high speed shared information channel pairs resources at the each carrier configured with high speed physical downlink shared channel resources;

The radio network controller records initial configuration information of the high speed physical downlink shared channel resources at the each carrier and records configuration information of the high speed physical downlink shared channel resources at the each carrier in real time;

According to the information recorded, when initially configuring high speed downlink packet access resources for a certain user equipment, the radio network controller configures associated dedicated physical channel resources at a certain carrier at which the high speed physical downlink shared channel resources are configured and sends configuration information of associated dedicated physical channel resources comprising the carrier information to a Node B;

When initially configuring high speed downlink packet access resources for a certain user equipment, the Node B configures one or plural high speed physical downlink shared channel carrier resources, wherein the carriers where associated dedicated physical channel are located must be included, and meanwhile, configures one or plural high speed shared control channel and high speed shared information channel pairs at the same carrier for the high speed physical downlink shared channel resources at each configured carrier for relevancy, and sends a configuration result to the radio network controller.

Wherein, configuration information steps of the high speed physical downlink shared channel resources at the each carrier recorded by the radio network controller above in real time are recorded according to the configuration result information sent by the Node B to the radio network controller.

The present invention also provides a method for configuring carrier resources adapted in the multi-carrier high speed downlink packet access, comprising the following steps:

A radio network controller configures the high speed physical downlink shared channel resources at one or plural carriers in a multi-carrier cell and configures one or plural high speed shared control channel and high speed shared information channel resources only at each carrier configured with high speed physical downlink shared channel resources;

When initially configuring high speed downlink packet access resources for a certain user equipment, the radio network controller selects one carrier, at which the associated dedicated physical channel resources are configured from the all carriers in the multi-carrier cell;

When initially configuring high speed downlink packet access resources for a certain user equipment, the Node B configures one or plural high speed physical downlink shared channel carrier resources, and meanwhile, configures one or plural high speed shared control channel and high speed shared information channel pairs at the same carrier for the high speed physical downlink shared channel resources at each configured carrier for relevancy, and sends a configuration result of high speed physical downlink shared channel carrier resources, high speed shared control channel and high speed shared information channel pair resources to the radio network controller.

The present invention also provides a method for configuring carrier resources adapted in the multi-carrier high speed downlink packet access, comprising the following steps:

A radio network controller configures high speed physical downlink shared channel resources at one or plural carriers in a multi-carrier cell and configures one or plural high speed shared control channel and high speed shared information channel pair resources at one or plural carriers;

The radio network controller records initial configuration information of the HS-PDSCH physical channel resources, high speed shared control channel and high speed information channel pair resources at the each carrier and records configuration information of HS-PDSCH physical channel resources, the high speed shared control channel and high speed information channel pair resources at the each carrier in real time;

According to the information recorded above, when initially configuring high speed downlink packet access resources for a user equipment, the radio network controller configures the associated dedicated physical channel resources at the carrier which is configured with high speed shared control channel and high speed shared information channel pair resources and sends configuration information of associated dedicated physical channel resources comprising carrier information to Node B;

When initially configuring high speed downlink packet access resources for a user equipment, the Node B configures one or plural high speed physical downlink shared channel carrier resources, and meanwhile, configures one or plural high speed shared control channel and high speed shared information channel pair resources at the carrier where the associated dedicated physical channels are located for the high speed physical downlink shared channel resources at the each configured carrier for relevancy, and sends a configuration result of high speed physical downlink shared channel carrier resources and high speed shared control channel and high speed shared information channel pair resources to the radio network controller.

Wherein, configuration information steps of HS-PDSCH physical channel resources, the high speed shared control channel and high speed shared information channel pair resources at each carrier recorded by the radio network controller in real time are recorded according to configuration result information sent by the Node B to the radio network controller.

The present invention also provides a method for configuring carrier resources adapted in the multi-carrier high speed downlink packet access, comprising the following steps:

A radio network controller configures high speed physical downlink shared channel resources at one or plural carriers in a multi-carrier cell and configures one or plural high speed shared control channel and high speed shared information channel pair resources at one or plural carriers;

The radio network controller records initial configuration information of the HS-PDSCH physical channel resources, the high speed shared control channel and high speed shared information channel pair resources at each carrier and records configuration information of the HS-PDSCH physical channel resources, the high speed shared control channel and high speed shared information channel pair resources at the each carrier in real time;

According to the information recorded, when initially configuring high speed downlink packet access resources for a user equipment, the radio network controller configures the associated dedicated physical channel resources at a carrier which is configured with the high speed shared control channel and high speed shared information channel pair resources and sends configuration information of associated dedicated physical channel resources comprising carrier information to the Node B;

When initially configuring high speed downlink packet access resources for a user equipment, the Node B configures one or plural high speed physical downlink shared channel carrier resources, meanwhile, configures one or plural high speed shared control channels and high speed shared information channel pair resources for the high speed physical downlink shared channel resources at the each configured carrier for relevancy at one or plural carriers, wherein the carrier where the associated dedicated physical channel is located must be included and sends a configuration result of the high speed physical downlink shared channel carrier resources and the high speed shared control channel and high speed shared information channel pair resources to the network controller.

Wherein, configuration information steps of the HS-PDSCH physical channel resources, the high speed shared control channel and high speed shared information channel pair resources at the each carrier recorded by the radio network controller in real time are recorded according to configuration result information sent by the Node B to the radio network controller.

The present invention also provides a method for configuring carrier resources adapted in the multi-carrier high speed downlink packet access, comprising the following steps:

A radio network controller configures a high speed physical downlink shared channel resources at one or plural carriers in a multi-carrier cell and configures one or plural high speed shared control channels and high speed shared information channel pair resources at one or plural carriers;

When initially configuring a high speed downlink packet access resources for a certain user equipment, the radio network controller selects one carrier, at which the associated dedicated physical channel resources is configured from all carriers in the multi-carrier cell;

When initially configuring the high speed downlink packet access resources for a certain user equipment, the Node B configures one or plural high speed physical downlink shared channel carrier resources, meanwhile, configures one or plural high speed shared control channels and high speed shared information channel pair for the high speed physical downlink shared channel resources at the each configured carrier for relevancy at one or plural carriers, and sends a configuration result of the high speed physical downlink shared channel carrier resources and the high speed shared control channel and high speed shared information channel pair resources to the network controller.

Configuring at a plurality of carriers and configuring the HS-PDSCH physical channel resources, the HS-SCCH and HS-SICH physical channel pair resources and the associated dedicated physical channel resources for the user equipment are realized by using the above five configuration methods of the carrier resources in the multi-carrier HSDPA technology provided by the present invention.

For HS-PSDCH at a plurality of carriers and the associated HS-SCCH and HS-SICH physical channels, to increase the utilization efficiency of the multi-carrier HS-PDSCH physical channels and system capacity, according to another aspect of the present invention, the present invention provides a method for configuring the carrier resources in the multi-carrier high speed downlink packet access, comprising the following steps: When initially configuring high speed downlink packet access resources for a user equipment, a Node B configures the high speed downlink packet access resources of N1 carriers for the user equipment, and configures the user equipment can use the high speed downlink packet access resources of not more than N2 carriers at the same time, wherein N2 is smaller than or equal to N1; a radio network controller sends the configuration information of the high speed downlink packet access resources of N1 carriers and the value of N2 to the user equipment; and in the process of sending the high speed downlink shared channel service data, in each transmission time interval, the Node B dynamically configures the high speed downlink packet access resources for the user equipment and configures the high speed downlink packet access resources of N3 carriers from N1 carriers for the user equipment, wherein N3 is smaller than or equal to N2.

Dispatching resources configuration, initial resources configuration and resources dynamic configuration can be conducted by the above configuration method of the carrier resources, so that the system can more flexibly and dynamically dispatch the HSDPA resources at a plurality of carriers according to the actual demand of service under the condition of satisfying the most demand of the UE service so as to realize the carrier load balance and increase the system capacity, and meanwhile reduce the search of the HS-SCCH channel by the UE and optimize the multi-carrier HSDPA technology and system.

At the same time, in order that a base station can properly configure the HSDPA carrier resources for each UE in the process of initial carrier resources configuring, according to another aspect of the present invention, the present invention also provides a method for configuring the carrier resources in the multi-carrier high speed downlink packet access, comprising the following steps: step 1, a radio network controller sends a quality of service information associated with services requested by the user equipment to a Node B; step 2, the Node B initially configures the high speed downlink packet access carrier resources for this request according to the quality of service information and a load condition of high speed downlink packet access channels at all carriers and sends a configuration result to the radio network controller.

In the above configuration method of the carrier resources, the RNC sends the QoS information requested associated with service to the Node B, which is used as an important foundation, when the Node B initially configures the HSDPA carrier resources, so that the initial configuration of the carrier resources by the Node B is optimized.

DETAILED DESCRIPTION OF THE PREFERRED EMBODIMENTS

Figure 1A:
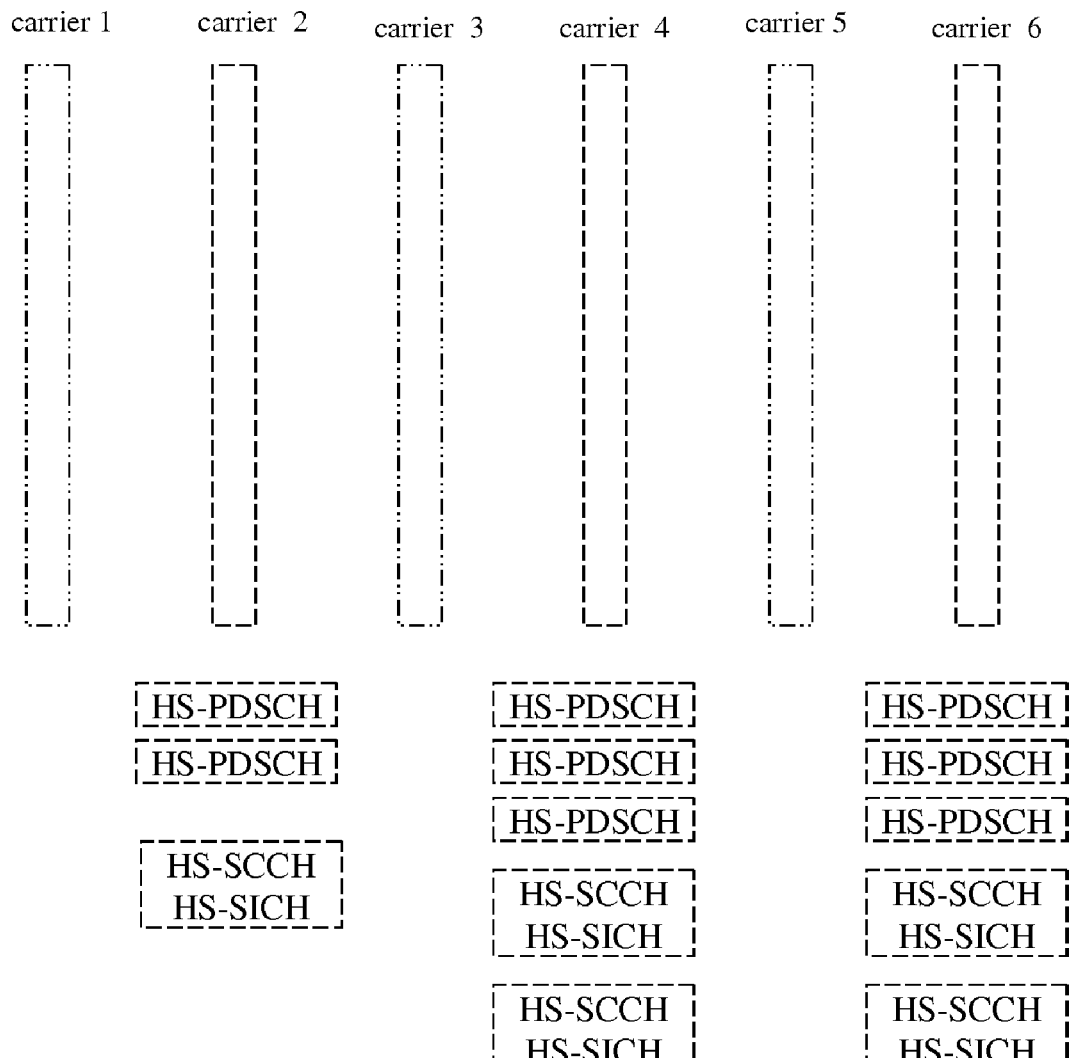
FIG. 1A schematically shows the RNC initially configures the HS-PDSCH, SCCH, and SICH physical channel resources according to the first embodiment of the present invention.

The same as the single carrier HSDPA technology, in the multi-carrier HSDPA technology, the downlink data service is sent by the HS-DSCH transmission channel, the transmission of the HS-DSCH is mapped to the HS-PDSCH physical channel, the control information associated with the configuration and control of the HS-PDSCH physical channel is sent in the downlink HS-SCCH physical channel and in the uplink HS-SICH physical channel. The channel characteristic of the HS-PDSCH, HS-SCCH and HS-SICH physical channels in the multi-carrier system and that of the associated dedicated channels comprising transmission channel and physical channel are the same as the characteristic of the single carrier system in the 3GPP protocol.

The system where the present invention is adapted is: The multi-carrier HSDPA resources in one multi-carrier cell, comprising the HS-PDSCH physical channel resources and the HS-SCCH and HS-SICH physical channel pair resources are configured by the RNC, wherein each HS-SCCH physical channel is regularly configured to be a pair with a certain HS-SICH physical channel at the same carrier. An MAC-hs function entity is set up by a Node B, i.e. in the Node B to manage and configure these HS-PDSCH physical channel resources, HS-SCCH and HS-SICH physical channel pair resources.

In the multi-carrier HSDPA technology, considering to be compatible with the TD-SCDMA single carrier HSDPA technology in the present 3GPP standard, the HS-SCCH and HS-SICH physical channel pair can only be used to configure the HS-PDSCH physical channel resources at one carrier, i.e. time slot and code channel, therefore, a two-step configuration method is adopted in the channel configuration and configuration in the multi-carrier HSDPA technology, i.e. first step: the initial configuration of the HSDPA resource. Initially configuring the carrier resources in the HS-PDSCH physical channel, the HS-SCCH and HS-SICH physical channel pair resources associated with the carrier of the HS-PDSCH physical channel and the associated dedicated physical channel resources to a user equipment; second step: i.e. the dynamic configuration of the HSDPA resources. Dynamically configuring the HS-PDSCH time slot and code channel resources in real time at the initially configured carrier through the HS-SCCH and HS-SICH physical channel.

In the HSDPA technology, the RNC initially configures the HS-SCCH and HS-SICH physical channel pair resources and the HS-PDSCH physical channel resources, which are managed and configured by the Node B. Additionally, the RNC is also in charge of managing and configuring the associated dedicated physical channel resources of uplink and downlink.

The present invention provides a method in the multi-carrier HSDPA technology of the TD-SCDMA system that the RNC initially configures the HS-SCCH and HS-SICH physical channel pair resources and the HS-PDSCH physical channel resources, configures the associated dedicated physical channel resources; a Node B initially configures the carrier resources of the HS-PDSCH physical channel and the associated HS-SCCH and HS-SICH physical channel so as to solve the problem of channel configuration, management and configuration by the RNC and Node in the multi-carrier HSDPA technology.

The following five solutions are provided to illustrate the present invention:

Solution 1, comprising the following steps:
1) The RNC sends a reconfiguration process of the physical shared channel in the NBAP protocol to a Node B through the Iub interface to realize the configuration of the HS-PDSCH physical channel resources and several pairs of HS-SCCH and HS-SICH physical channel pair resources at one or plural carriers in a multi-carrier cell. For the each carrier configured with the HS-PDSCH physical channel resources, only at which several HS-SCCH and HS-SICH physical channel pair resources are configured, different quantities of the HS-SCCH and HS-SICH physical channel pair resources can be configured according to the different quantities of the HS-PDSCH physical channel resources configured at them. The configuration rules of the two resources are the same as those in the single carrier HSDPA technology of the present 3GPP standard.

As shown in FIG. 1A, supposed there are 6 carriers, the HS-PDSCH physical channel are configured at the carrier 2, 4 and 6, and at each carrier of the carriers 2, 4 and 6, the HS-SCCH and HS-SICH physical channel pairs are configured, wherein the carrier 2 is configured with 1 pair, carriers 4 and 6 are respectively configured with 2 pairs. The dashed frame represents the configured channels and carriers (except the dedicated channel carrier), and the double dot dash line frame represents the carriers not configured with the HSDPA resources.

2) The RNC records the initial configuration information of the HS-PDSCH physical channel resources at each carrier and records the configuration information of the HS-PDSCH physical channel resources at each carrier in real time. According to the information sent by the Node B in step 4, the RNC can record the number of user equipments of the configured HS-PDSCH physical channel carrier resources at each carrier in real time so as to estimate the load condition of the HSDPA resources at the carrier.

Figure 1B:
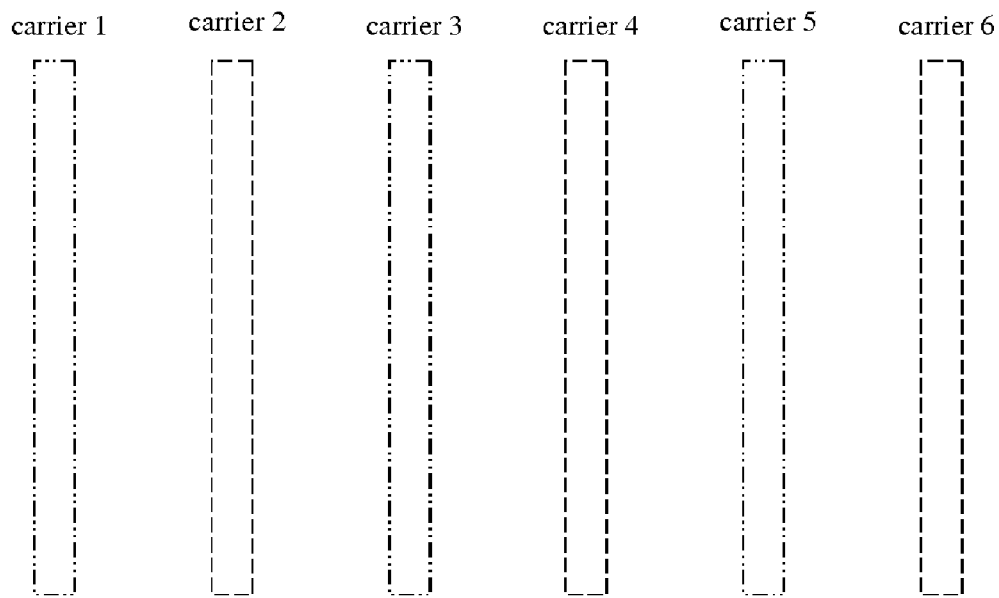
FIG. 1B schematically shows the RNC configures the dedicated physical channel according to the first embodiment of the present invention.
Figure 1B:
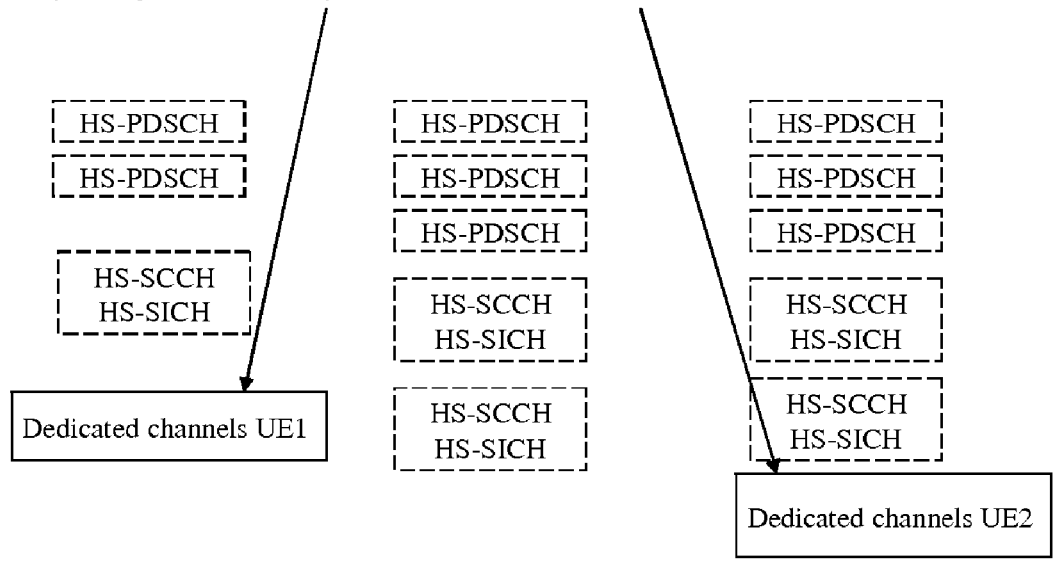
Figure 1B:
Figure 1B:
Figure 1B:
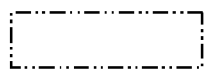
Figure 1C:
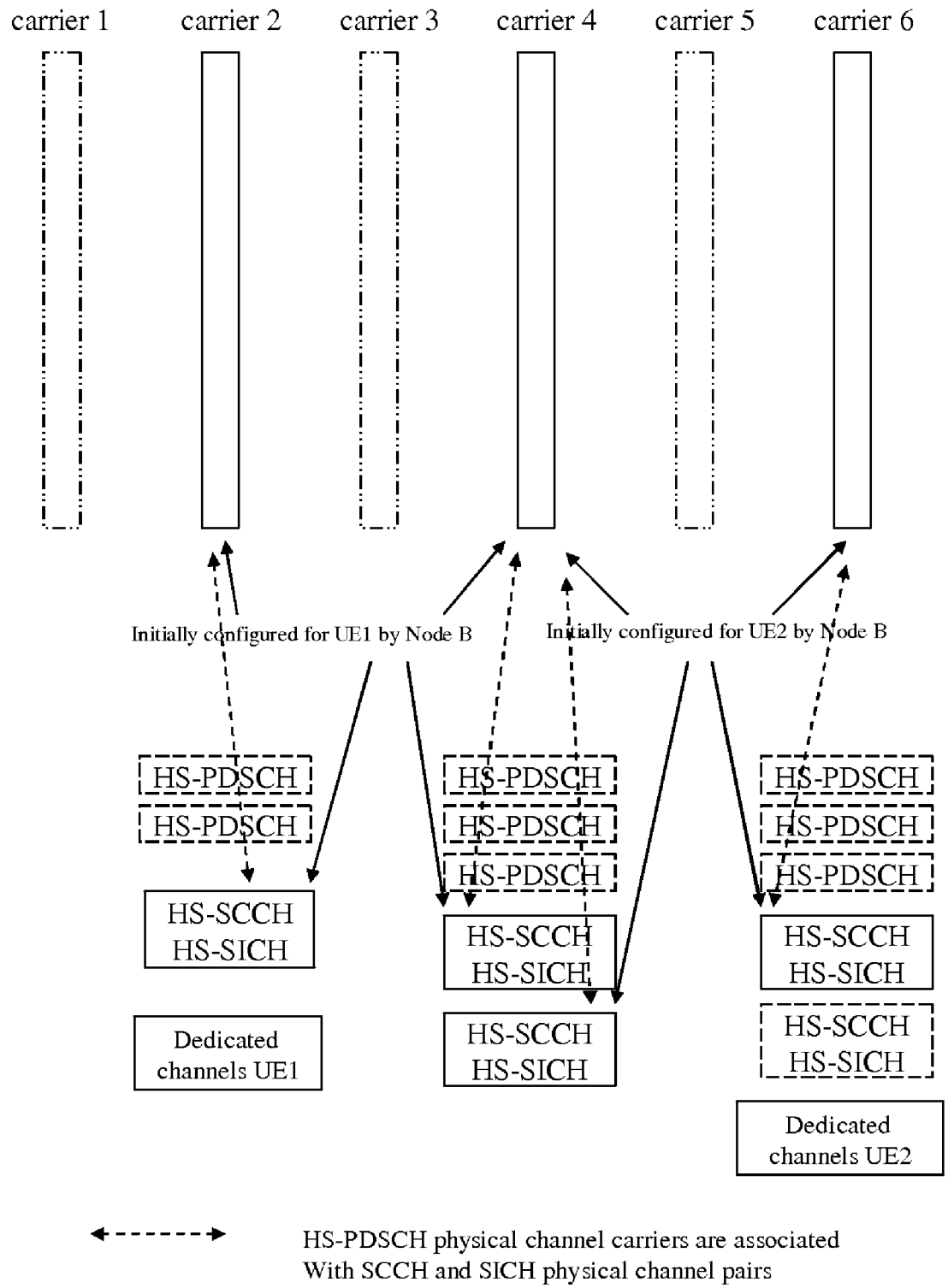
FIG. 1C schematically shows a Node B initially configures the HS-PDSCH physical channel carrier resources, the SCCH and SICH physical channel pair, and the association relations according to the first embodiment of the present invention.

Wherein, the configuration information recorded in real time is from the configuration result as shown in FIG. 1C that a UE (user equipment) is configured at the carriers 2 and 6, and two UEs are configured at the carrier 4.

3) When the RNC determines to configure the HSDPA resources for a certain service of a certain user equipment, the RNC configures the associated dedicated physical channel resources for the user equipment at the carrier configured with the HS-PDSCH physical channel resources, sends the configuration information (including carrier information) of the associated dedicated physical channel resources to the Node B, and meanwhile requests the Node B to configure the other resources associated with the HSDPA for the user equipment. The RNC can send a request process in a Radio Link Setup process, a Synchronised Radio Link Reconfiguration Preparation process or an Asynchronised Radio Link Reconfiguration process in the NBAP protocol to the Node B through the Iub interface to complete the step.

When the RNC configures the carrier resources of the associated dedicated physical channel resources for a certain UE, at least two aspects of factors are needed to be considered: first, the condition of the available physical channel resources not configured at a carrier; second, the number of the user equipments of the configured HS-PDSCH physical channel carrier resources at the carrier, according to which the RNC can estimate the load condition of the HSDPA resources at the carrier.

As shown in FIG. 1B, the dedicated associated physical channels (according to the records in step 2, the HS-PDSCH, HS-SCCH and HS-SICH can be configured at the carriers 2 and 6) are configured for the UE1 and the UE2 at the carrier 2 and carrier 6 selected. In the figure, the real line frame represents the configured channels and carriers (except the dedicated channel carriers), the dashed frame represents the configured channels and carriers (except the dedicated channel carriers), and the double-point lineation frame represents the carriers not configured with the HSDPA resources.

4) When the Node B initially configures the HSDPA resources for a certain user equipment, the Node B configures one or plural HS-PDSCH physical channel carrier resources for the user equipment, wherein the carrier where the associated dedicated physical channels are located must be included. Meanwhile, for the HS-PDSCH physical channel resources at each configured carrier, one or plural HS-SCCH and HS-SICH physical channel pairs are configured at the carrier again, to be associated.

When the Node B configures the HS-PDSCH physical channel carrier resources and the HS-SCCH and HS-SICH physical channel pair resources, the factors to be considered comprise at least: the carrier where the associated dedicated physical channels are located, the multi-carrier ability information of the user equipment, the service feature information, and the configuration and use condition of the HS-PDSCH physical channel resources and HS-SCCH and Hs-SICH physical channel pair resources at each carrier. The first three kinds of information is provided by the RNC in the associated resources request information; and the last information is provided by the Node B itself, for the Node B is in charge of managing the configuration of the associated resources.

The Node B sends the configuration results of the HS-PDSCH physical channel carrier resources and the HS-SCCH and HS-SICH physical channel pair resources to the RNC.

FIG. 1C schematically shows that the Node B initially configures the HS-PDSCH physical channel carrier resources, the SCCH and SICH physical channel pairs and the associated relations. The Node B configures two HS-PDSCH carrier resources at the carrier 2 and the carrier 4 for the UE1. An HS-SCCH and HS-SICH physical channel pair, respectively associated with the HS-PDSCH carrier resources at the carrier 2 and carrier 4 is respectively configured at the carrier 2 and carrier 4 at the same time. The Node B configures two HS-PDSCH carrier resources at the carrier 4 and the carrier 6 for the UE2. A pair of HS-SCCH and HS-SICH physical channels, respectively associated with the HS-PDSCH carrier resources at the carrier 4 and carrier 6 are respectively configured at the carrier 4 and carrier 6 at the same time. Wherein the dashed line frame represents configured channels, the real line frame represents the configured channels, and the dashed double-arrowhead represents that the HS-PDSCH physical channel carriers are associated with the SCCH and SICH physical channel pairs.

Figure 1D:
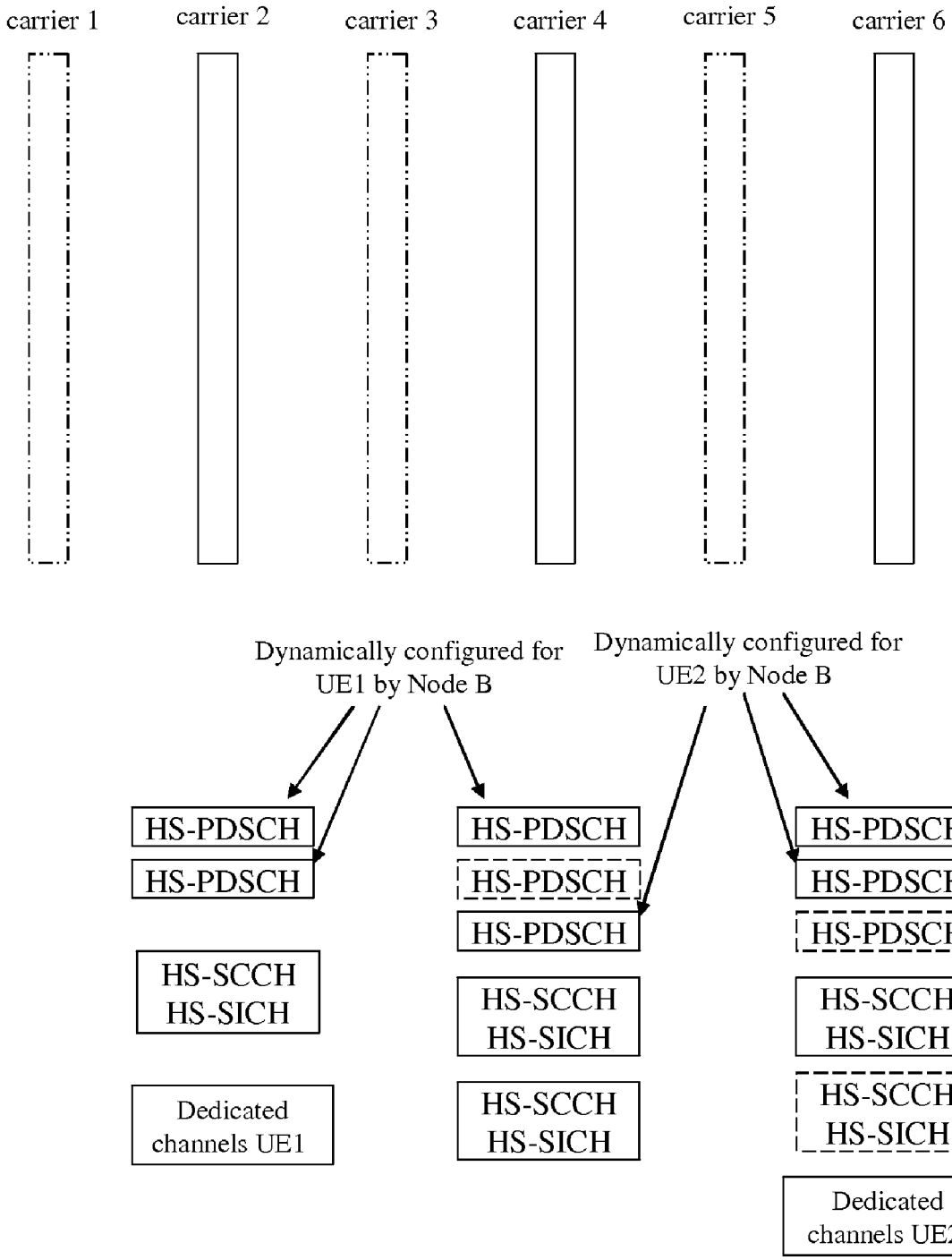
FIG. 1D schematically shows the Node B dynamically configures the HS-PDSCH physical channel resources for the UE according to the first embodiment of the present invention.

In this way, when the Node B dynamically configures the HS-PDSCH physical channel resources for the UE, the configuration condition is as shown in FIG. 1D, wherein the real line frame represents the configured channels and carriers (except the dedicated channel carriers), the dashed line frame represents the configured channels and carriers (except the dedicated channel carriers), and the double-point lineation frame represents the carriers not configured with the HSDPA resources.

Solution 2, comprising the following steps:

1) The RNC sends a reconfiguration process of the physical shared channel in the NBAP protocol to a Node B through the Iub interface to realize the configuration of the HS-PDSCH physical channel resources and several pairs of HS-SCCH and HS-SICH physical channel pair resources at one or plural carriers in a multi-carrier cell. For each carrier configured with the HS-PDSCH physical channel resources, only at which several HS-SCCH and HS-SICH physical channel pair resources are configured, different quantities of the HS-SCCH and HS-SICH physical channel pair resources can be configured according to the different quantities of the HS-PDSCH physical channel resources configured at them. The configuration rules of the two resources are the same as those in the single carrier HSDPA technology of the present 3GPP standard.

Figure 2A:
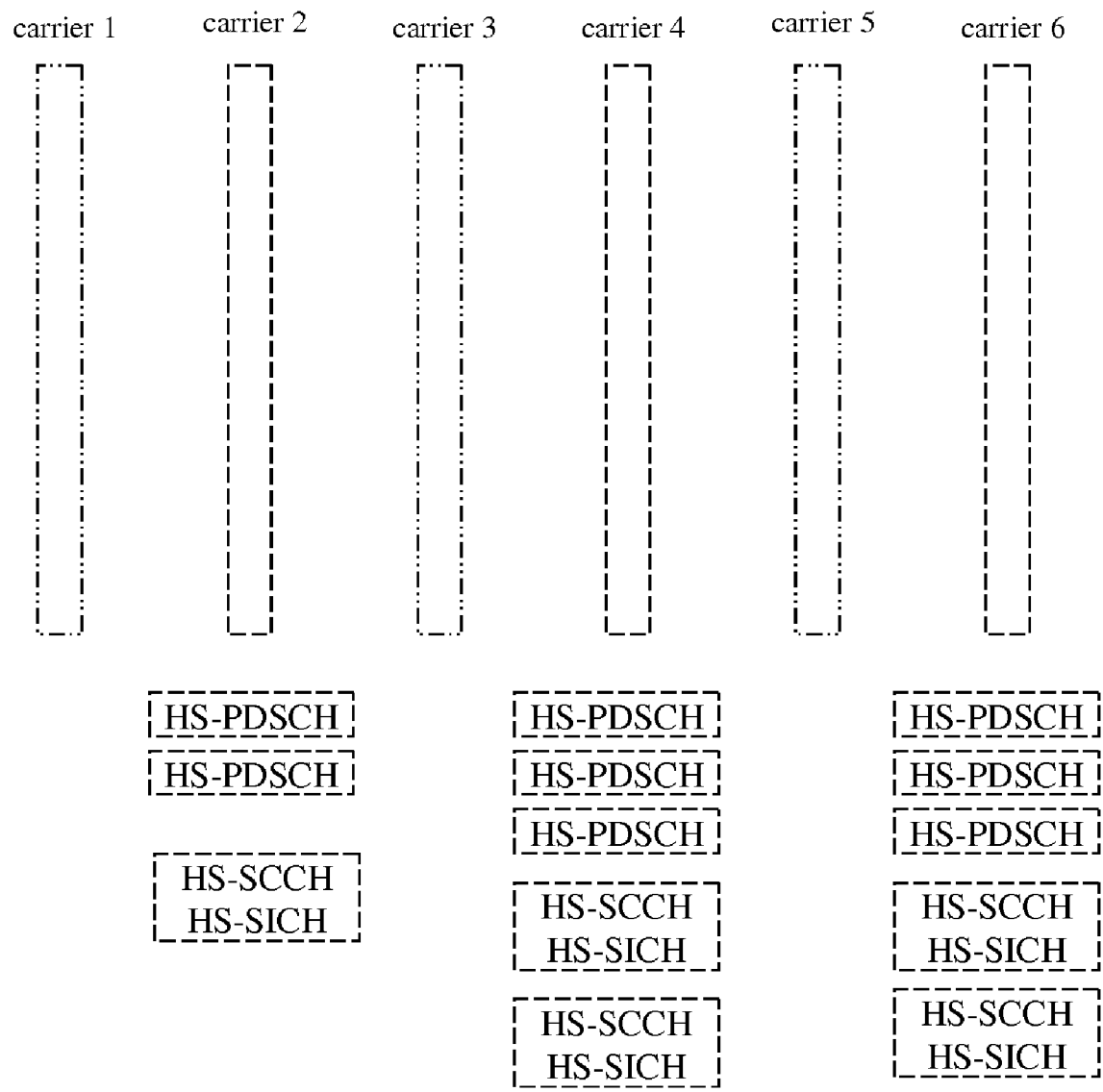
FIG. 2A schematically shows the RNC initially configures the HS-PDSCH, SCCH, and SICH physical channel resources according to the second embodiment of the present invention.

As shown in FIG. 2A, supposed there are 6 carriers, the HS-PDSCH physical channel are configured at the carrier 2, 4 and 6, and at each carrier of the carriers 2, 4 and 6, the HS-SCCH and HS-SICH physical channel pairs are configured, wherein the carrier 2 is configured with 1 pair, carriers 4 and 6 are respectively configured with 2 pairs.

2) When the RNC determines to configure the HSDPA resources for a certain service of a certain user equipment, the RNC configures the associated dedicated physical channel resources for the user equipment at a appropriated carrier of all the carriers in the multi-carrier cell, sends the configuration information (including carrier information) of the associated dedicated physical channel resources to the Node B, and meanwhile requests the Node B to configure the other resources associated with the HSDPA for the user equipment. The RNC can send a request process in a Radio Link Setup process, a Synchronised Radio Link Reconfiguration Preparation process or an Asynchronised Radio Link Reconfiguration process in the NBAP protocol to the Node B through the Iub interface to complete the step.

When the RNC configures the carrier resources of the associated dedicated physical channel resources for a certain UE, the condition of the available physical channel resources not configured at the carrier is needed to be considered at least.

Figure 2B:
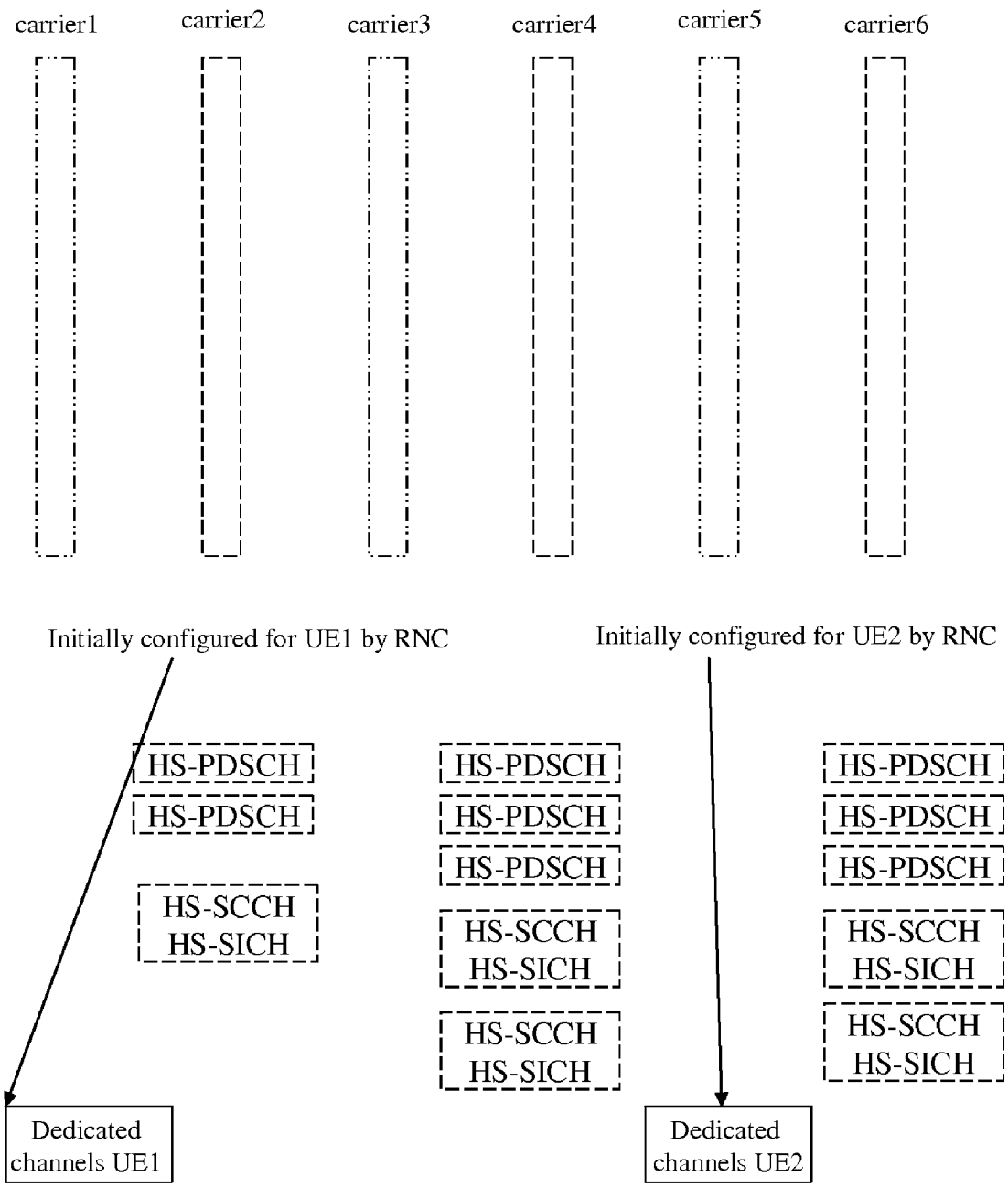
FIG. 2B schematically shows the RNC configures the dedicated physical channel according to the second embodiment of the present invention.

As shown in FIG. 2B, the dedicated associated physical channels are respectively configured for the UE1 and the UE2 at the carrier 1 and carrier 5 selected.

3) When the Node B initially configures the HSDPA resources for a certain user equipment, the Node B configures one or plural HS-PDSCH physical channel carrier resources for the user equipment. Meanwhile, for the HS-PDSCH physical channel resources at each configured carrier, one or plural HS-SCCH and HS-SICH physical channel pairs are configured at the carrier again, to be associated.

When the Node B configures the HS-PDSCH physical channel carrier resources and the HS-SCCH and HS-SICH physical channel pair resources, the factors to be considered comprise at least: the multi-carrier ability information of the user equipment, the service feature information, and the configuration and use condition of the HS-PDSCH physical channel resources and HS-SCCH and Hs-SICH physical channel pair resources at each carrier. The first two kinds of information is provided by the RNC in the associated resources request information; and the last information is provided by the Node B itself, for the Node B is in charge of managing the configuration of the associated resources.

Figure 2C:
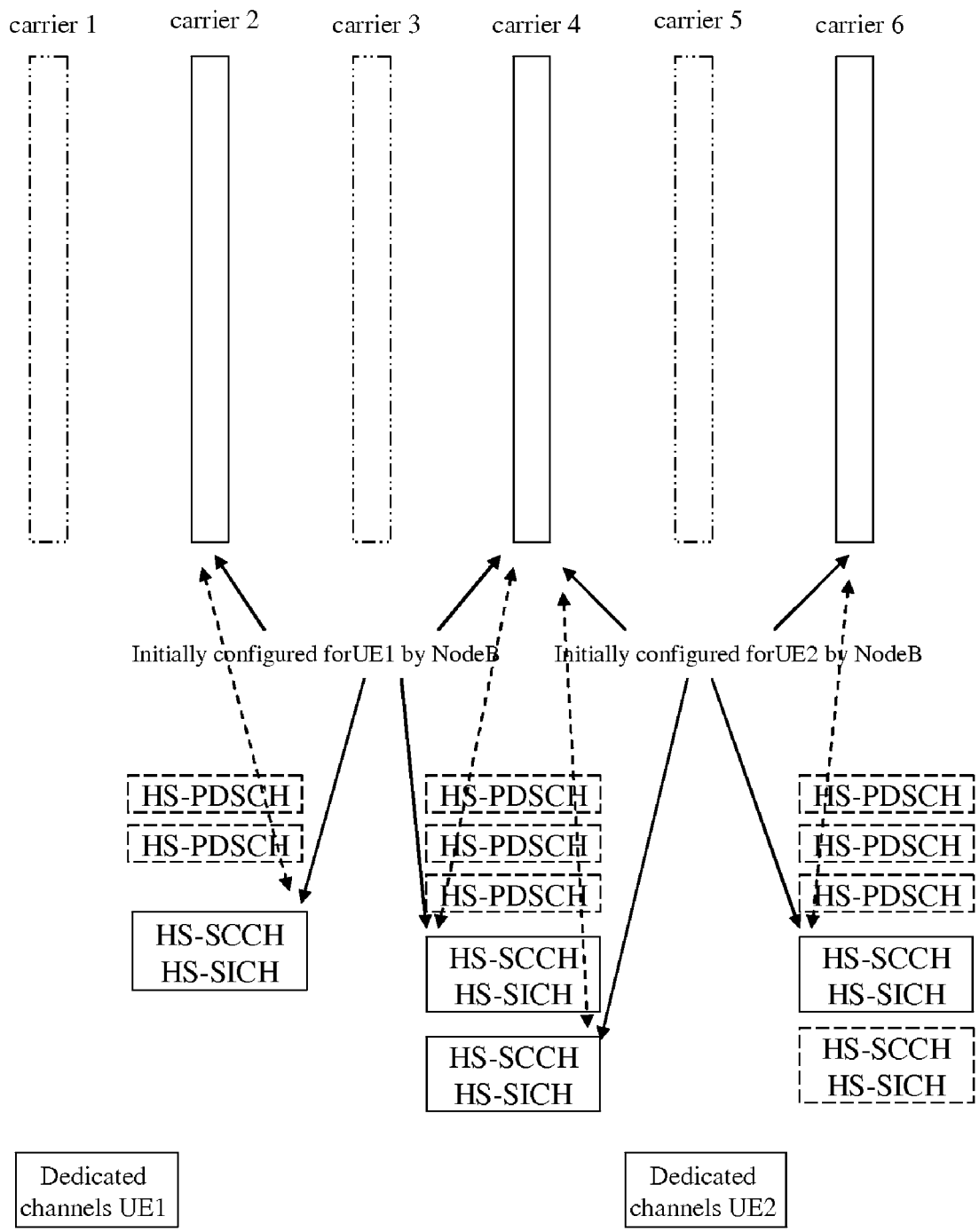
FIG. 2C schematically shows the Node B initially configures the HS-PDSCH physical channel carrier resources, the SCCH and SICH physical channel pair, and the association relations according to the second embodiment of the present invention.

As shown in FIG. 2C, the Node B configures two HS-PDSCH carrier resources at the carrier 2 and the carrier 4 for the UE1. An HS-SCCH and HS-SICH physical channel pair, respectively associated with the HS-PDSCH carrier resources at the carrier 2 and carrier 4 is respectively configured at the carrier 2 and carrier 4 at the same time. The Node B configures two HS-PDSCH carrier resources at the carrier 4 and the carrier 6 for the UE2. A pair of HS-SCCH and HS-SICH physical channels, respectively associated with the HS-PDSCH carrier resources at the carrier 4 and carrier 6 are respectively configured at the carrier 4 and carrier 6 at the same time.

Figure 2D:
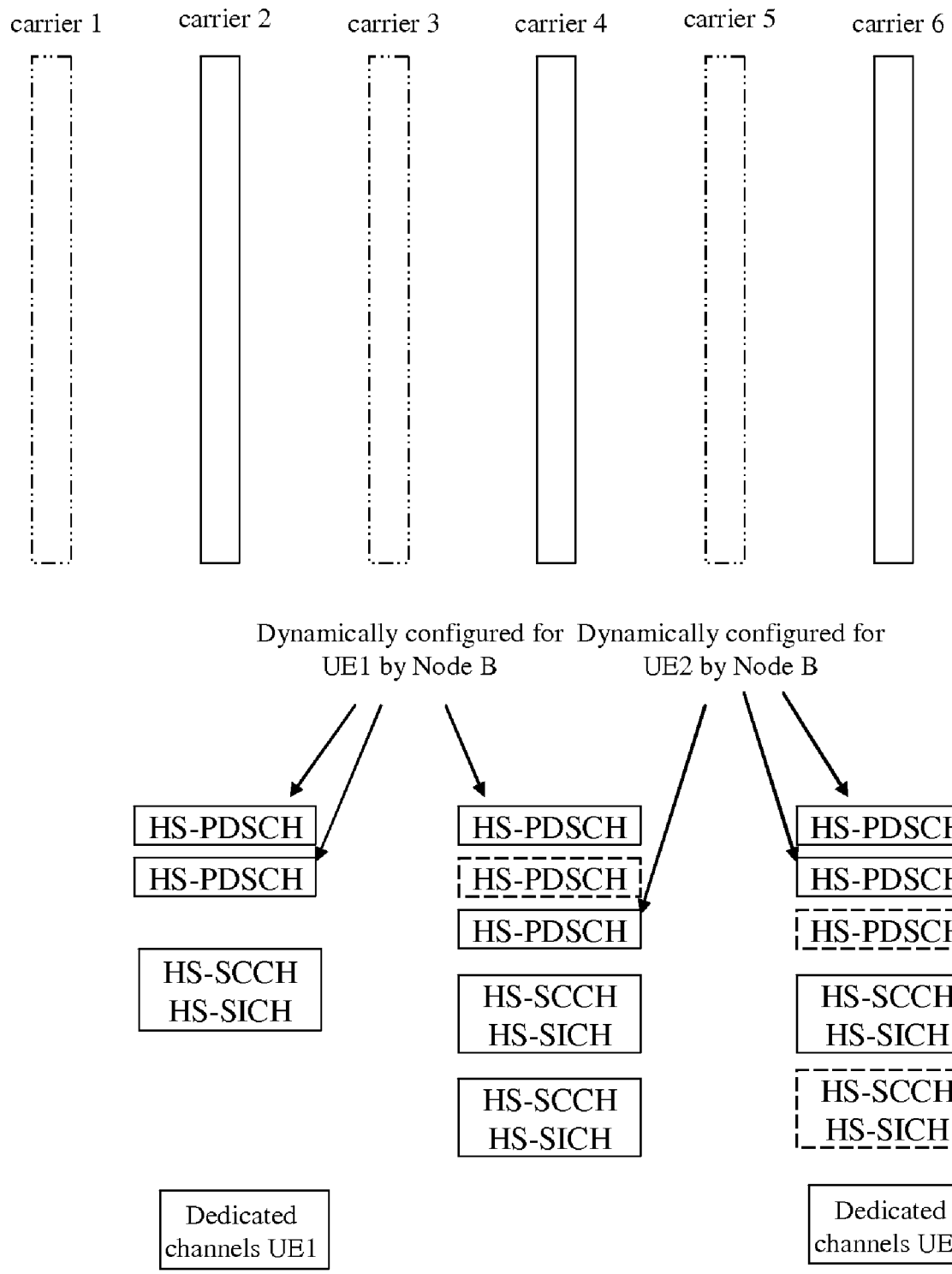
FIG. 2D schematically shows the Node B dynamically configures the HS-PDSCH physical channel resources for the UE according to the second embodiment of the present invention.

In this way, when the Node B dynamically configures the HS-PDSCH physical channel resources for the UE, the configuration condition is as shown in FIG. 2D, wherein the real line frame represents the configured channels and carriers (except the dedicated channel carriers), the dashed line frame represents the configured channels and carriers (except the dedicated channel carriers), and the double-point lineation frame represents the carriers not configured with the HSDPA resources.

The Node sends the configuration result of the HS-PDSCH physical channel carrier resources and the HS-SCCH and HS-SICH physical channel pair resources to the RNC.

Solution 3, comprising the following steps:

1) The RNC sends a reconfiguration process of the physical shared channel in the NBAP protocol to a Node B through the Iub interface to realize the configuration of the HS-PDSCH physical channel resources and several pairs of HS-SCCH and HS-SICH physical channel pair resources at one or plural carriers in a multi-carrier cell.

When the RNC configures the HS-SCCH and HS-SICH physical channel pair resources at one or plural carriers in the multi-carrier cell, it can configure one or plural HS-SCCH and HS-SICH physical channel pair resources only at the carriers within the scope of the subset of the carries configured with the HS-PDSCH physical channel resources; and can also conduct configuration independent from the carriers where the HS-PDSCH physical channel resources are located.

Figure 3A:
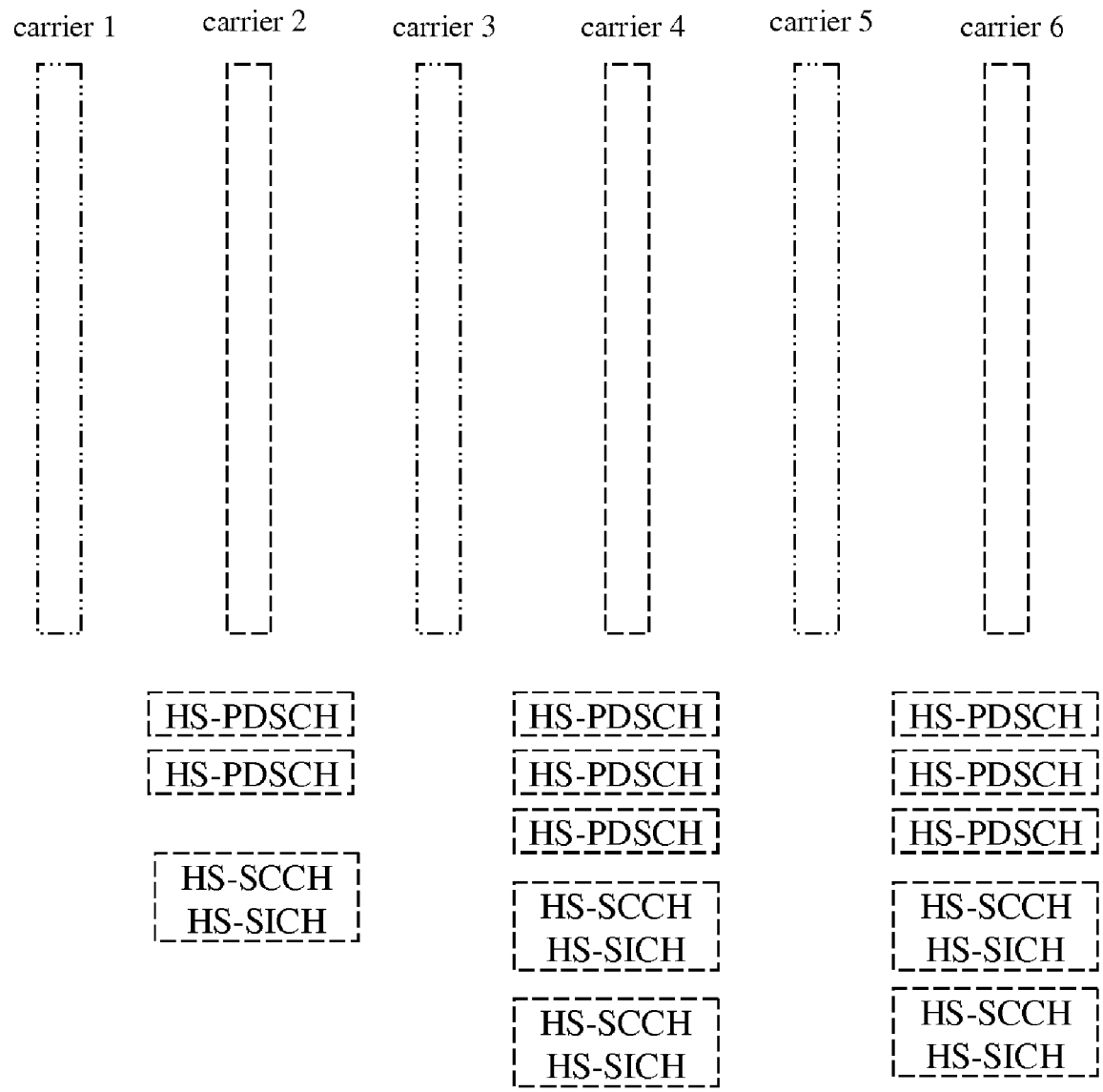
FIG. 3A schematically shows the RNC initially configures the HS-PDSCH, SCCH, and SICH physical channel resources according to the third embodiment of the present invention.

As shown in FIG. 3A, supposed there are 6 carriers, the HS-PDSCH physical channel are configured at the carrier 2, 4 and 6, and at each carrier of the carriers 2, 4 and 6, the HS-SCCH and HS-SICH physical channel pairs are configured, wherein the carrier 2 is configured with 1 pair, carriers 4 and 6 are respectively configured with 2 pairs.

2) The RNC records the initial configuration information of the HS-PDSCH physical channel resources and the HS-SCCH and HS-SICH physical channel pair resources at each carrier and records the configuration information of the HS-PDSCH physical channel resources and the HS-SCCH and HS-SICH physical channel pair resources at each carrier in real time. According to the information sent by the Node B in step 4, the RNC can record the number of user equipments of the configured HS-PDSCH physical channel carrier resources at each carrier and the number of the user equipments which are configured for each HS-SCCH and HS-SICH physical channel pair at each carrier in real time so as to estimate the load condition of the HSDPA resources and the HS-SCCH and HS-SICH physical channel pair resources at the carrier.

Figure 3B:
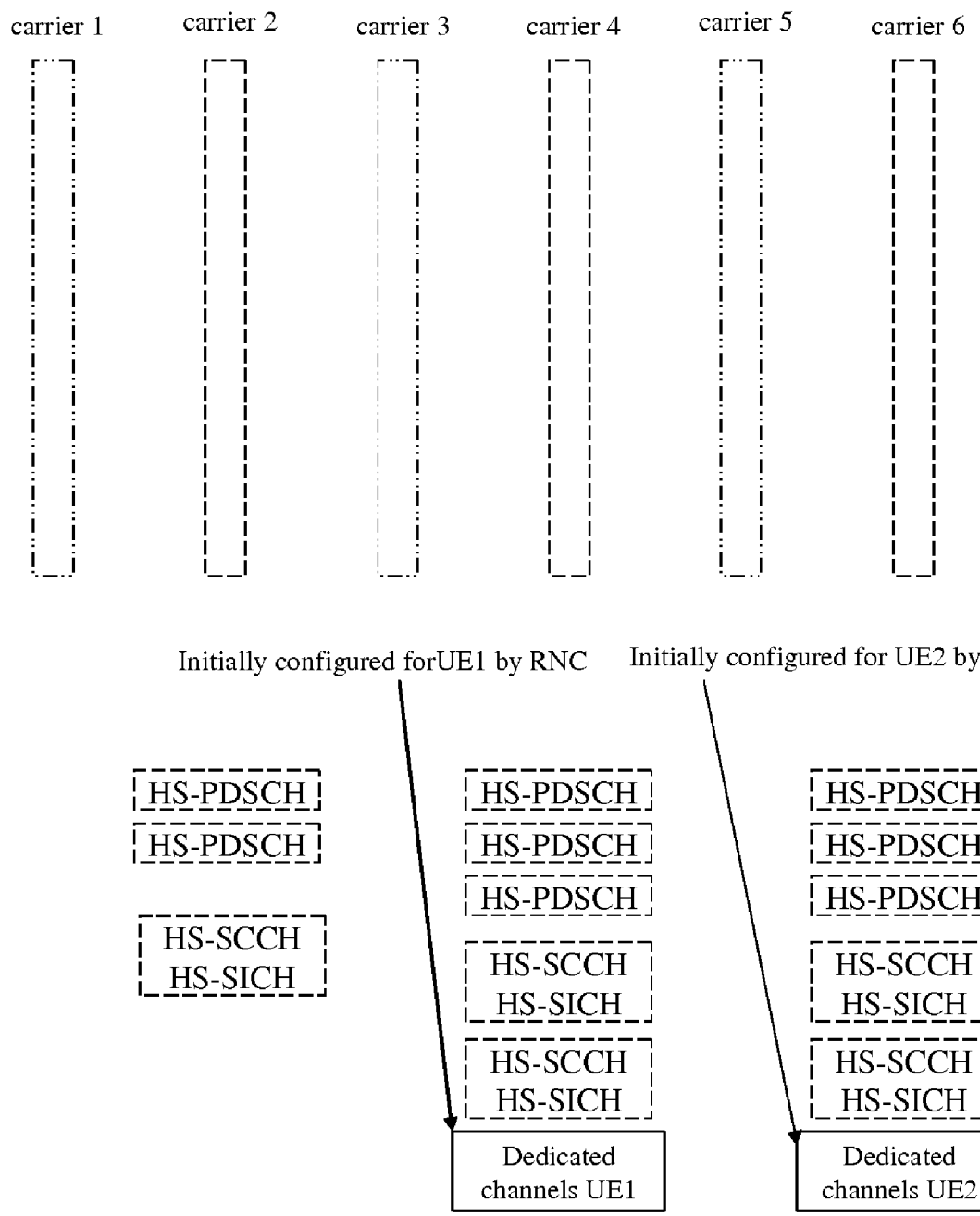
FIG. 3B schematically shows the RNC configures the dedicated physical channel according to the third embodiment of the present invention.
Figure 3C:
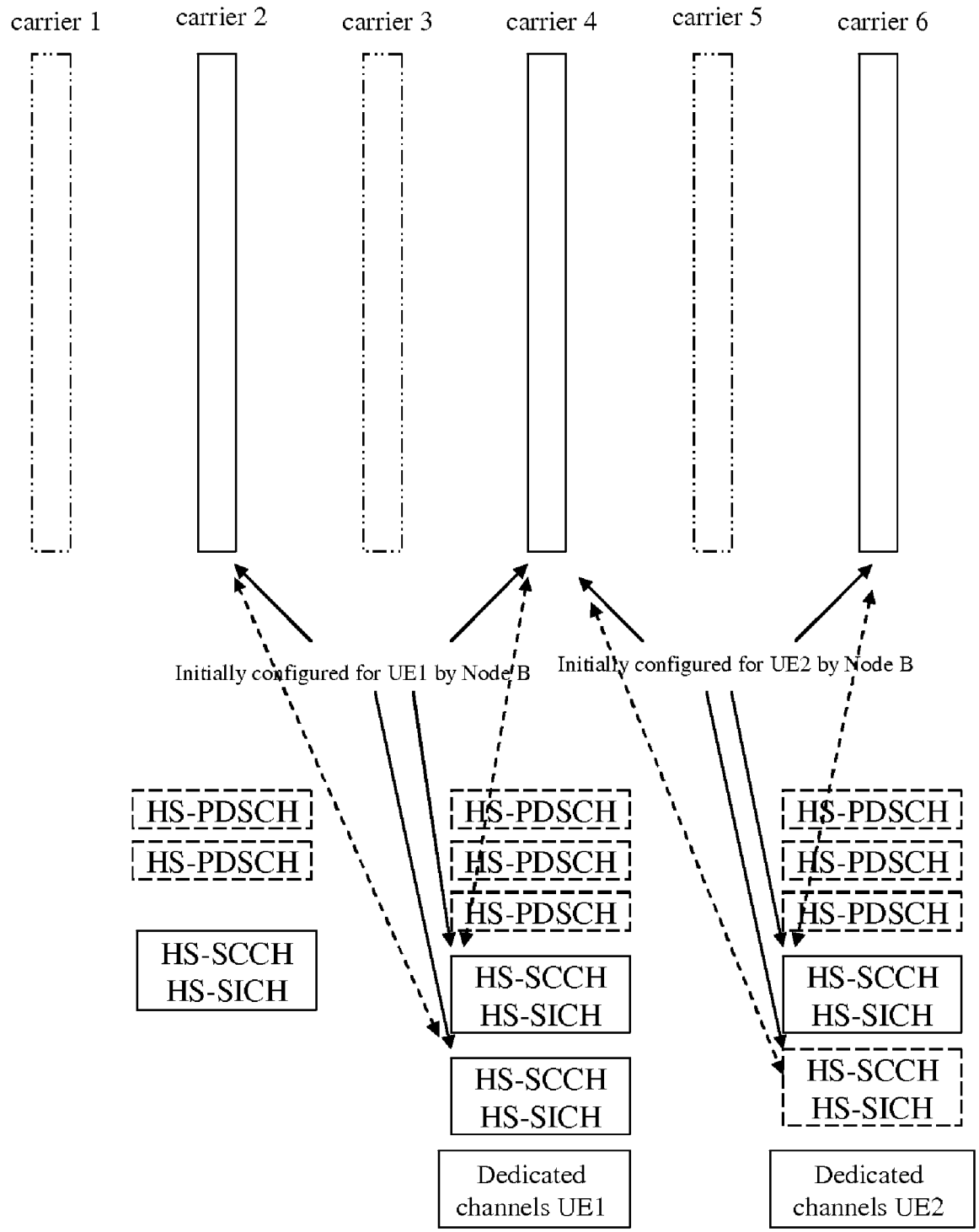
FIG. 3C schematically shows the Node B initially configures the HS-PDSCH physical channel carrier resources, the SCCH and SICH physical channel pair, and the association relations according to the third embodiment of the present invention.

Wherein, the configuration result of the records is from that in the FIG. 3C. The HS-PDSCH physical channel resources at the carriers 2 and 6 are configured for a UE (a user equipment), and the HS-PDSCH physical channel resources at the carrier 4 are configured for two UEs. Two pairs of HS-SCCH and HS-SICH physical channel pairs at the carrier 4 are respectively configured for one UE. Two pairs of HS-SCCH and HS-SICH physical channel pairs at the carrier 6 are respectively configured for one UE.

3) When the RNC determines to configure the HSDPA resources for a certain service of a certain user equipment, the RNC configures the associated dedicated physical channel resources for the user equipment at the carrier configured with the HS-SCCH and HS-SICH physical channel pair resources, sends the configuration information (including carrier information) of the associated dedicated physical channel resources to the Node B, and meanwhile requests the Node B to configure the other resources associated with the HSDPA for the user equipment. The RNC can send a request process in a Radio Link Setup process, a Synchronised Radio Link Reconfiguration Preparation process or an Asynchronised Radio Link Reconfiguration process in the NBAP protocol to the Node B through the Iub interface to complete the step.

When the RNC configures the carrier resources of the associated dedicated physical channel resources for a certain UE, at least three aspects of factors can be considered: first, the condition of the available physical channel resources not configured at a carrier; second, the number of the user equipments of the configured HS-PDSCH physical channel carrier resources at the carrier, according to which the RNC can estimate the load condition of the HS-PDSCH physical channel resources at the carrier; third, at the carrier, the number of user equipments configured for each HS-SCCH and HS-SICH physical channel pair, according to which the load condition of the HS-SCCH and HS-SICH physical channel pair resources at the carrier is estimated.

As shown in FIG. 3B, the dedicated associated physical channels (according to the records in step 2, the HS-SCCH, HS-SICH and HS-PDSCH can be configured at the carriers 4 and 6) are configured for the UE1 and the UE2 at the carrier 4 and carrier 6 selected.

4) When the Node B initially configures the HSDPA resources for a certain user equipment, the Node B configures one or plural HS-PDSCH physical channel carrier resources for the user equipment. Meanwhile, for the HS-PDSCH physical channel resources at each configured carrier, one or plural HS-SCCH and HS-SICH physical channel pair resources are configured at the carriers where the associated dedicated physical channels are located, to be associated.

When the Node B configures the HS-PDSCH physical channel carrier resources, two forms of processing can be conducted. The one is that the carriers where the associated dedicated physical channels are located must be included; the other is that the configuration is conducted independent from the carriers where the associated dedicated physical channels are located.

When the Node B configures the HS-PDSCH physical channel carrier resources and the HS-SCCH and HS-SICH physical channel pair resources, the factors to be considered comprise at least: the carrier where the associated dedicated physical channels are located, the multi-carrier ability information of the user equipment, the service feature information, and the configuration and use condition of the HS-PDSCH physical channel resources and HS-SCCH and HS-SICH physical channel pair resources at each carrier. The first three kinds of information is provided by the RNC in the associated resources request information; and the last information is provided by the Node B itself, for the Node B is in charge of managing the configuration of the associated resources.

The Node sends the configuration result of the HS-PDSCH physical channel carrier resources and the HS-SCCH and HS-SICH physical channel pair resources to the RNC.

As shown in FIG. 3C, the Node B configures two HS-PDSCH carrier resources at the carrier 2 and the carrier 4 for the UE1. Two pairs of HS-SCCH and HS-SICH physical channels, respectively associated with the HS-PDSCH carrier resources at the carrier 2 and carrier 4 are configured at the carrier 4 at the same time. The Node B configures two HS-PDSCH carrier resources at the carrier 4 and the carrier 6 to the UE2. Two HS-SCCH and HS-SICH physical channel pairs, respectively associated with the HS-PDSCH carrier resources at the carrier 4 and carrier 6 are configured at the carrier 6 at the same time.

Figure 3D:
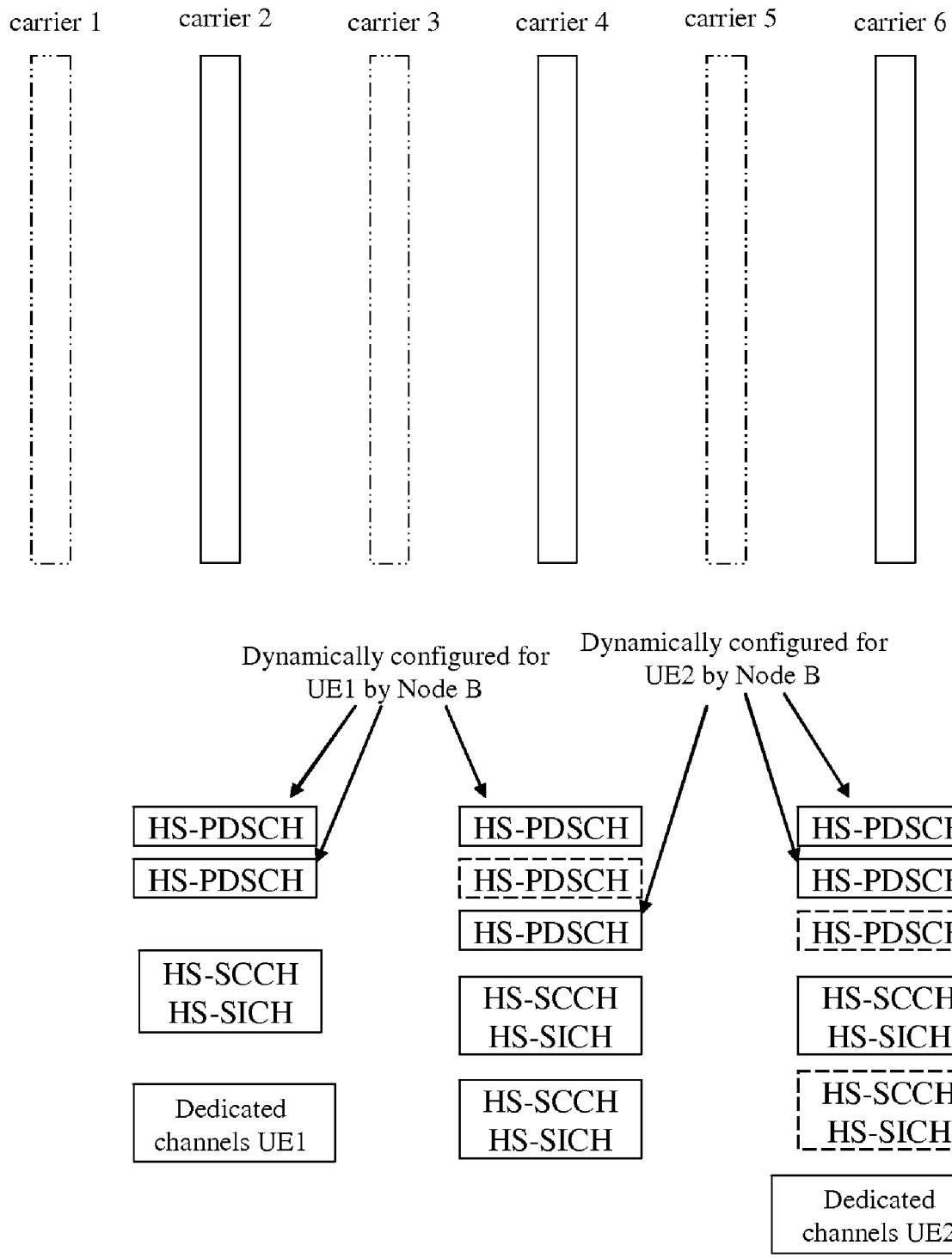
FIG. 3D schematically shows the Node B dynamically configures the HS-PDSCH physical channel resources for the UE according to the third embodiment of the present invention.

In this way, when the Node B dynamically configures the HS-PDSCH physical channel resources for the UE, the configuration condition is as shown in FIG. 3D, wherein the real line frame represents the configured channels and carriers (except the dedicated channel carriers), the dashed line frame represents the configured channels and carriers (except the dedicated channel carriers), and the double-point lineation frame represents the carriers not configured with the HSDPA resources.

Solution 4, comprising the following steps:
1) The RNC sends a reconfiguration process of the physical shared channel in the NBAP protocol to a Node B through the Iub interface to realize the configuration of the HS-PDSCH physical channel resources and several pairs of HS-SCCH and HS-SICH physical channel pair resources at one or plural carriers in a multi-carrier cell.

When the RNC configures the HS-SCCH and HS-SICH physical channel pair resources at one or plural carriers in the multi-carrier cell, it can configure one or plural HS-SCCH and HS-SICH physical channel pair resources only at the carriers within the scope of the subset of the carries configured with the HS-PDSCH physical channel resources; and can also conduct configuration independent from the carriers where the HS-PDSCH physical channel resources are located.

Figure 4A:
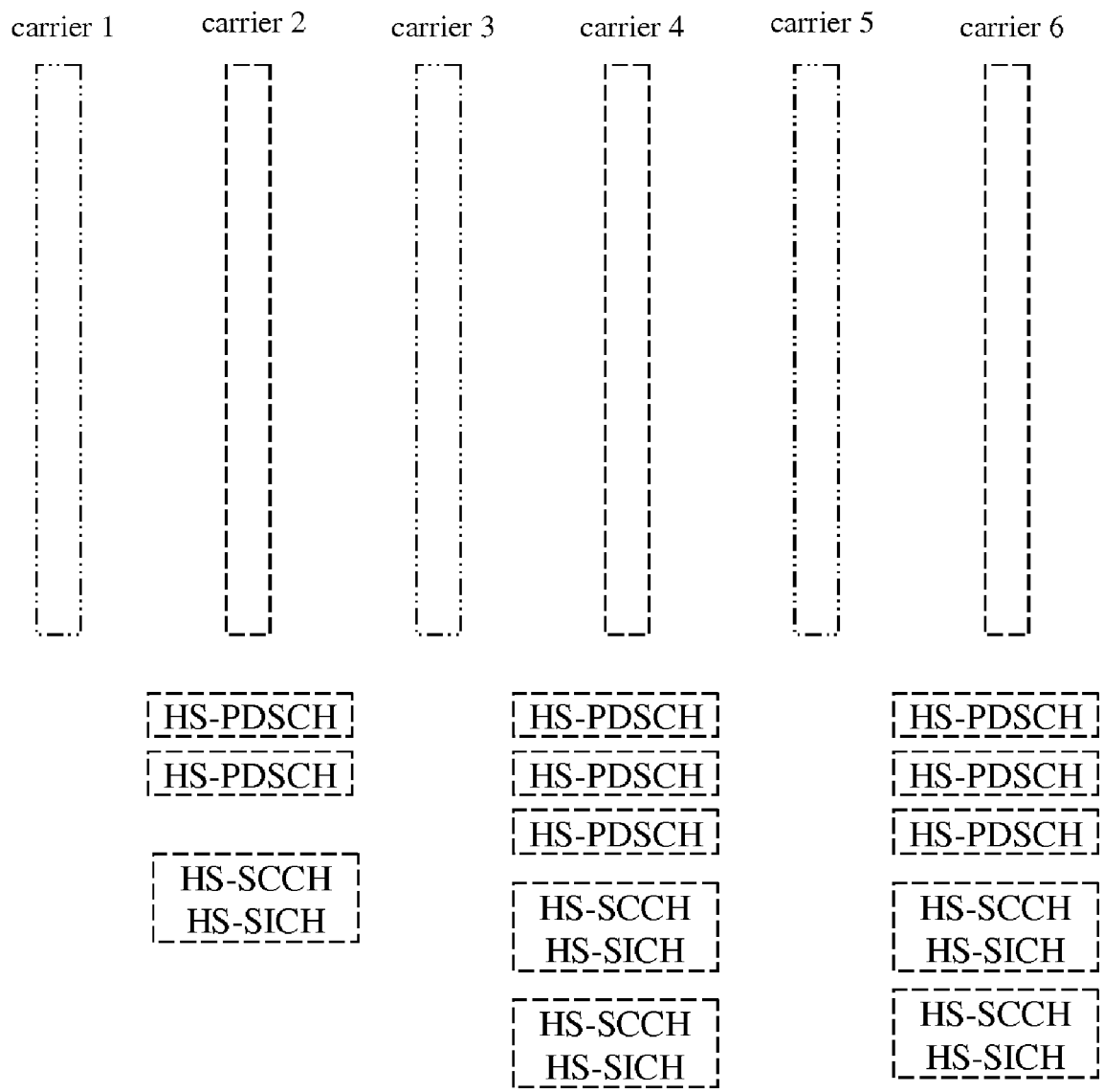
FIG. 4A schematically shows the RNC initially configures the HS-PDSCH, SCCH, and SICH physical channel resources according to the fourth embodiment of the present invention.

As shown in FIG. 4A, supposed there are 6 carriers, the HS-PDSCH physical channel are configured at the carrier 2, 4 and 6, and at each carrier of the carriers 2, 4 and 6, the HS-SCCH and HS-SICH physical channel pairs are configured, wherein the carrier 2 is configured with 1 pair, carriers 4 and 6 are respectively configured with 2 pairs.

2) The RNC records the initial configuration information of the HS-PDSCH physical channel resources and the HS-SCCH and HS-SICH physical channel pair resources at each carrier and records the configuration information of the HS-PDSCH physical channel resources and the HS-SCCH and HS-SICH physical channel pair resources at each carrier in real time. The RNC can record the number of user equipments of the configured HS-PDSCH physical channel carrier resources at each carrier and the number of user equipments which are configured for each HS-SCCH and HS-SICH physical channel pair at each carrier in real time according to the information sent by the Node B in step 4 so as to estimate the load condition of the HSDPA resources and the HS-SCCH and HS-SICH physical channel pair resources at the carrier.

Figure 4B:
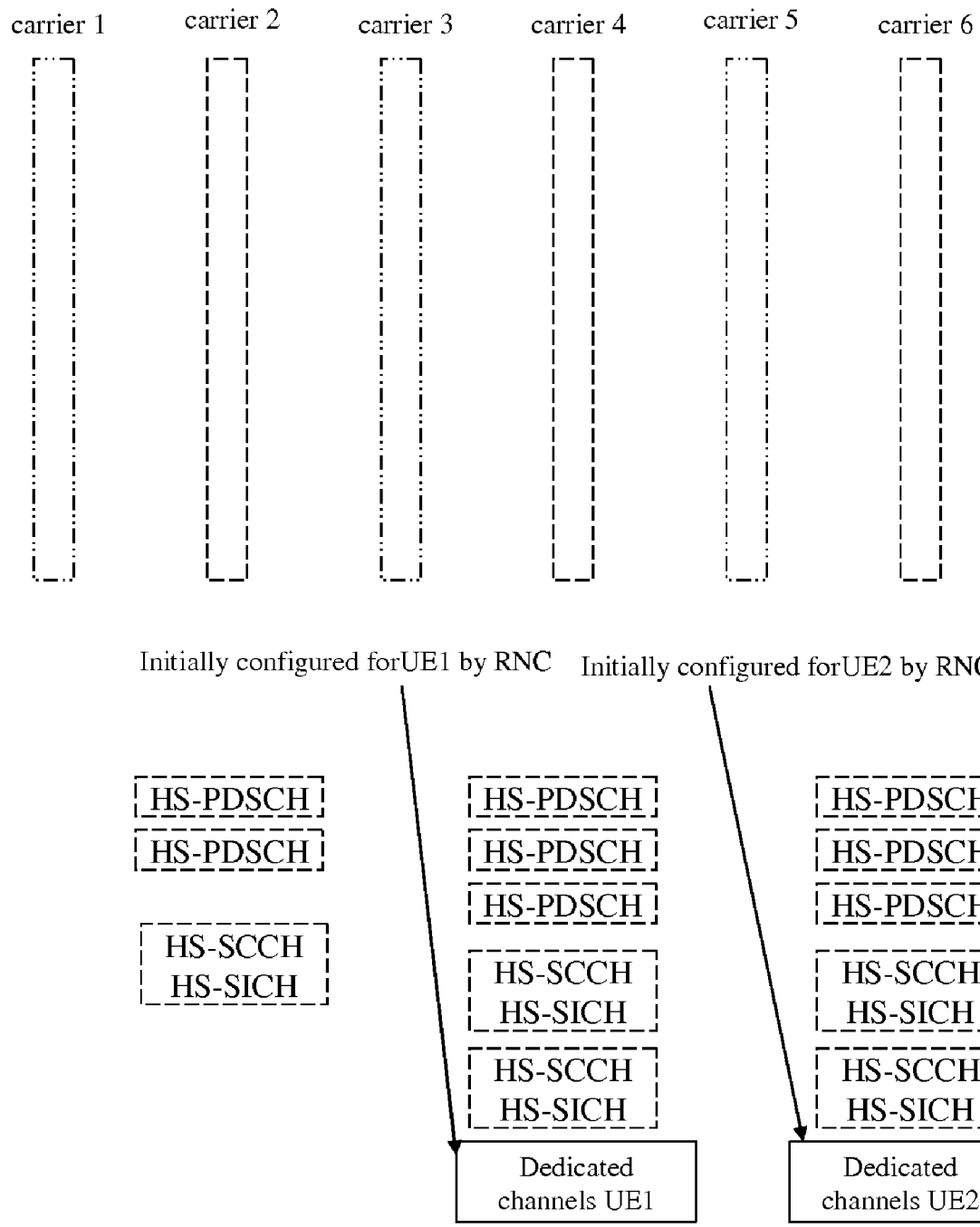
FIG. 4B schematically shows the RNC configures the dedicated physical channel according to the fourth embodiment of the present invention.
Figure 4C:
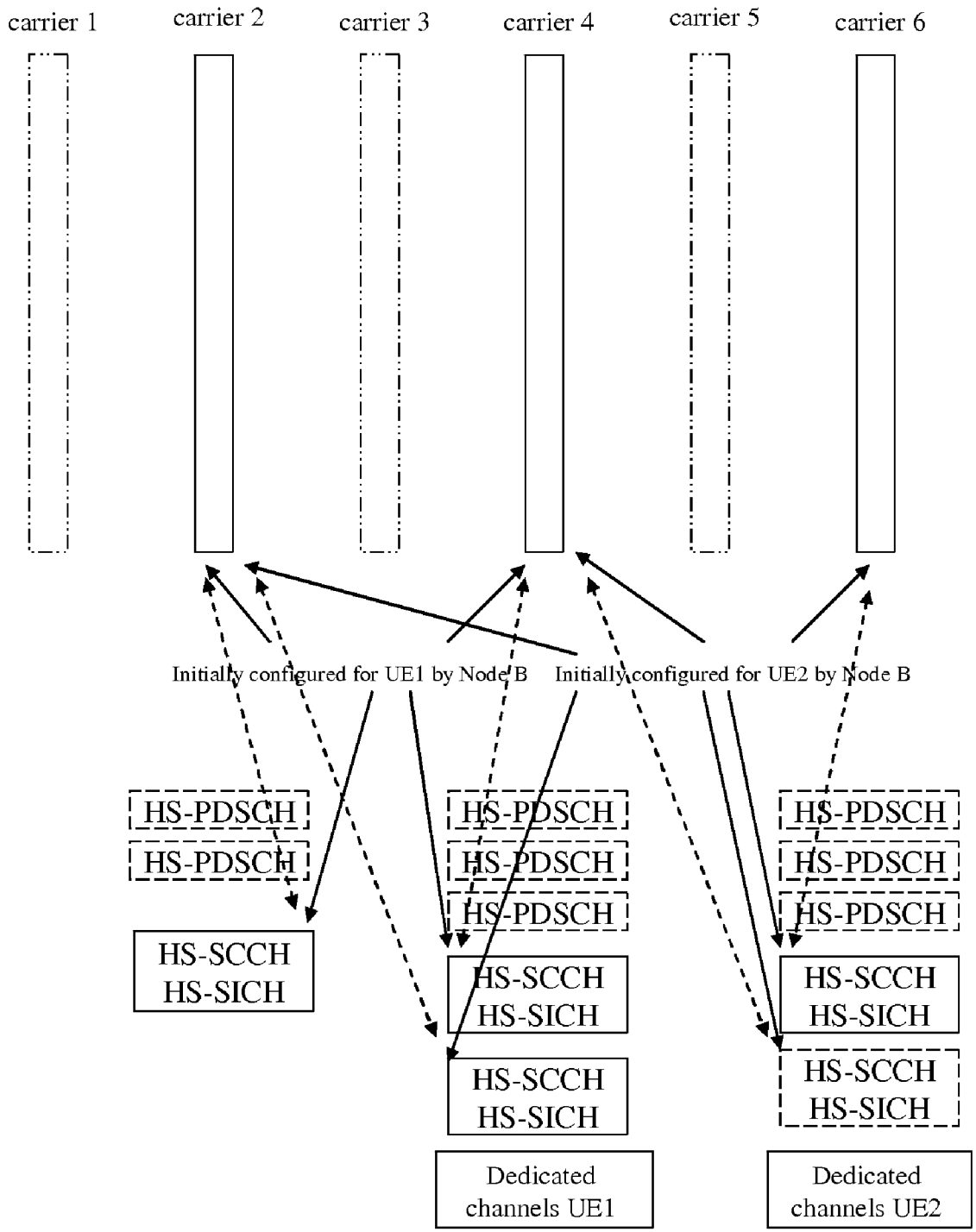
FIG. 4C schematically shows the Node B initially configures the HS-PDSCH physical channel carrier resources, the SCCH and SICH physical channel pair, and the association relations according to the fourth embodiment of the present invention.

Wherein, the configuration result of the records is from that in the FIG. 4C. The HS-PDSCH physical channel resources at the carriers 2 and 6 are configured for a UE (user equipment), and the HS-PDSCH physical channel resources at the carrier 4 are configured for two UEs. One HS-SCCH and HS-SICH physical channel pair at the carrier 2 is configured for one UE. Two pairs of HS-SCCH and HS-SICH physical channel pairs at the carrier 4 are respectively configured for one UE. Two pairs of HS-SCCH and HS-SICH physical channel pairs at the carrier 6 are respectively configured for one UE.

3) When the RNC determines to configure the HSDPA resources for a certain service of a certain user equipment, the RNC configures the associated dedicated physical channel resources for the user equipment at the carrier configured with the HS-SCCH and HS-SICH physical channel pair resources, sends the configuration information (including carrier information) of the associated dedicated physical channel resources to the Node B, and meanwhile requests the Node B to configure other resources associated with the HSDPA for the user equipment. The RNC can send a request process in a Radio Link Setup process, a Synchronised Radio Link Reconfiguration Preparation process or an Asynchronised Radio Link Reconfiguration process in the NBAP protocol to the Node B through the Iub interface to complete the step.

When the RNC configures the carrier resources of the associated dedicated physical channel resources for a certain UE, at least three aspects of factors can be considered: first, the condition of the available physical channel resources not configured at a carrier; second, the number of the user equipments of the configured HS-PDSCH physical channel carrier resources at the carrier, according to which the RNC can estimate the load condition of the HS-PDSCH physical channel resources at the carrier; third, at the carrier, the number of user equipments configured for each HS-SCCH and HS-SICH physical channel pair, according to which the load condition of the HS-SCCH and HS-SICH physical channel pair resources at the carrier is estimated.

As shown in FIG. 4B, the dedicated associated physical channels (according to the records in step 2, the HS-SCCH, HS-SICH and HS-PDSCH can be configured at the carriers 4 and 6) are configured for the UE1 and the UE2 at the carrier 4 and carrier 6 selected.

4) When the Node B initially configures the HSDPA resources for a certain user equipment, the Node B configures one or plural HS-PDSCH physical channel carrier resources for the user equipment. Meanwhile, for the HS-PDSCH physical channel resources at each configured carrier, one or plural HS-SCCH and HS-SICH physical channel pairs are configured at one or plural carriers, wherein the carrier where the associated dedicated physical channels are located must be included, to be associated.

When the Node B configures the HS-PDSCH physical channel carrier resources, two forms of processing can be conducted. The one is that the carriers where the associated dedicated physical channels are located must be included; the other is that the configuration is conducted independent from the carriers where the associated dedicated physical channels are located.

When the Node B configures the HS-PDSCH physical channel carrier resources and the HS-SCCH and HS-SICH physical channel pair resources, the factors to be considered comprise at least: the carrier where the associated dedicated physical channels are located, the multi-carrier ability information of the user equipment, the service feature information, and the configuration and use condition of the HS-PDSCH physical channel resources and HS-SCCH and HS-SICH physical channel pair resources at each carrier. The first three kinds of information is provided by the RNC in the associated resources request information; and the last information is provided by the Node B itself, for the Node B is in charge of managing the configuration of the associated resources.

The Node sends the configuration result of the HS-PDSCH physical channel carrier resources and the HS-SCCH and HS-SICH physical channel pair resources to the RNC.

As shown in FIG. 4C, the Node B configures two HS-PDSCH carrier resources at the carrier 2 and the carrier 4 for the UE1. Two HS-SCCH and HS-SICH physical channel pairs, respectively associated with the HS-PDSCH carrier resources at the carrier 2 and carrier 4 are configured at the carrier 2 and the carrier 4 at the same time. The Node B configures three HS-PDSCH carrier resources at the carrier 2, the carrier 4 and the carrier 6 for the UE2. Three HS-SCCH and HS-SICH physical channel pairs, respectively associated with the HS-PDSCH carrier resources at the carrier 2, the carrier 4 and carrier 6 are configured at the carrier 2 and the carrier 6 at the same time.

Figure 4D:
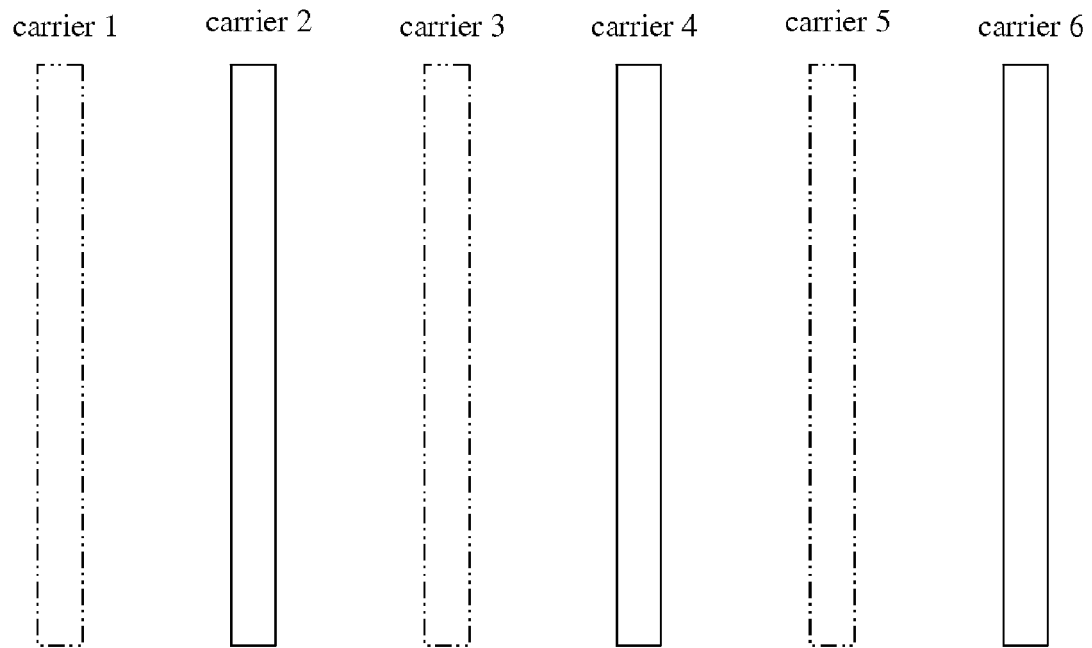
FIG. 4D schematically shows the Node B dynamically configures the HS-PDSCH physical channel resources for the UE according to the fourth embodiment of the present invention.
Figure 4D:
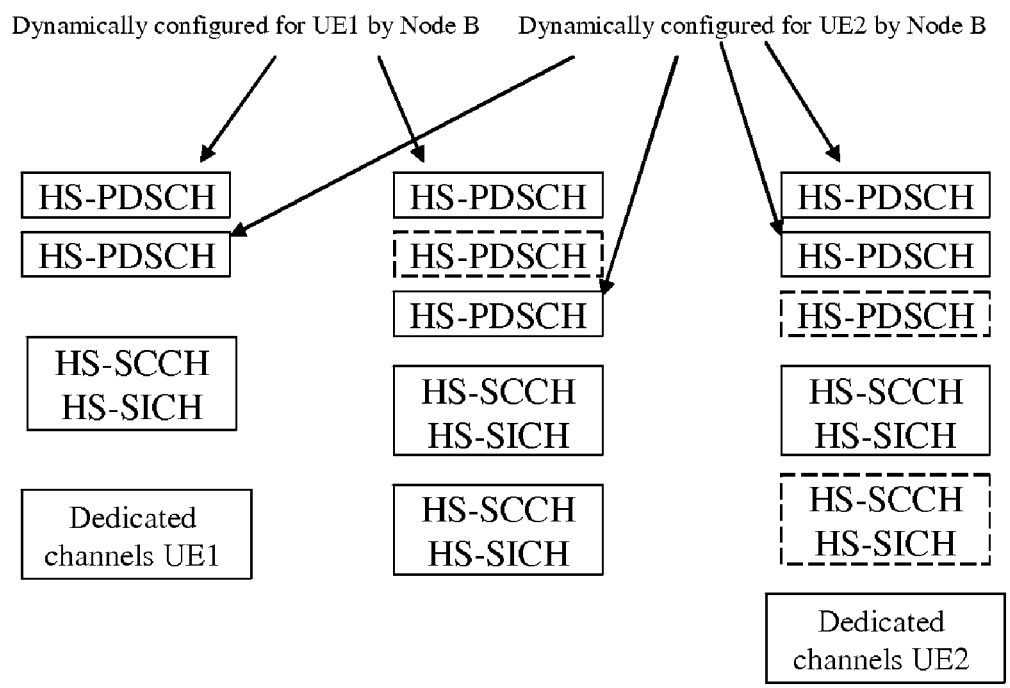

In this way, when the Node B dynamically configures the HS-PDSCH physical channel resources for the UE, the configuration condition is as shown in FIG. 4D, wherein the real line frame represents the configured channels and carriers (except the dedicated channel carriers), the dashed line frame represents the configured channels and carriers (except the dedicated channel carriers), and the double-point lineation frame represents the carriers not configured with the HSDPA resources.

Solution 5, comprising the following steps:
1) The RNC sends a reconfiguration process of the physical shared channel in the NBAP protocol to a Node B through the Iub interface to realize the configuration of the HS-PDSCH physical channel resources and several pairs of HS-SCCH and HS-SICH physical channel pair resources at one or plural carriers in a multi-carrier cell.

When the RNC configures the HS-SCCH and HS-SICH physical channel pair resources at one or plural carriers in the multi-carrier cell, it can configure one or plural HS-SCCH and HS-SICH physical channel pair resources only at the carriers within the scope of the subset of the carries configured with the HS-PDSCH physical channel resources; and can also conduct configuration independent from the carriers where the HS-PDSCH physical channel resources are located.

Figure 5A:
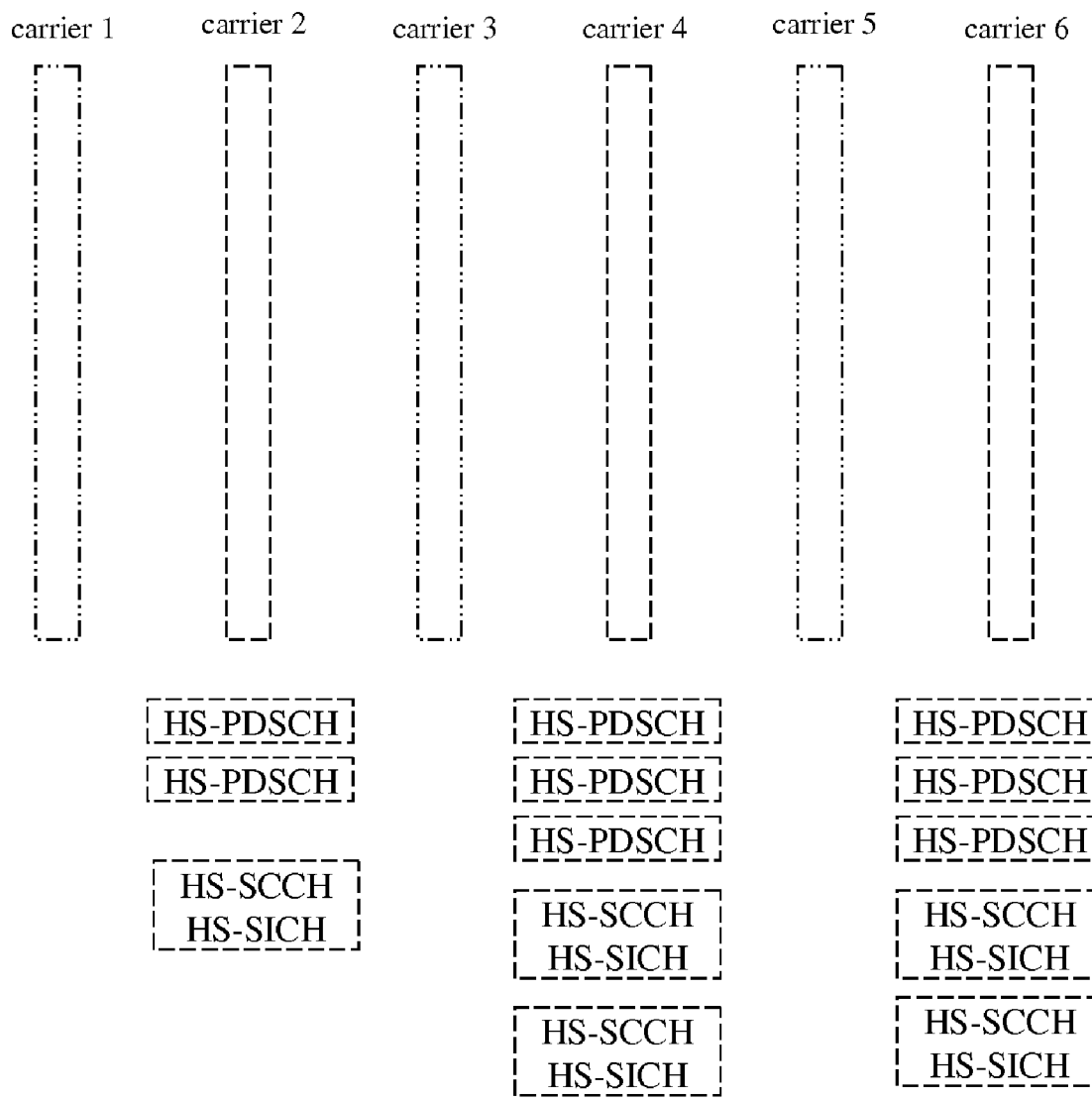
FIG. 5A schematically shows the RNC initially configures the HS-PDSCH, SCCH, and SICH physical channel resources according to the fifth embodiment of the present invention.

As shown in FIG. 5A, supposed there are 6 carriers, the HS-PDSCH physical channel are configured at the carrier 2, 4 and 6, and at each carrier of the carriers 2, 4 and 6, the HS-SCCH and HS-SICH physical channel pairs are configured, wherein the carrier 2 is configured with 1 pair, carriers 4 and 6 are respectively configured with 2 pairs.

2) When the RNC determines to configure the HSDPA resources for a certain service of a certain user equipment, the RNC selects one carrier of all the carriers in the multi-carrier cell, at which the RNC configures the associated dedicated physical channel resources for the user equipment, sends the configuration information (including carrier information) of the associated dedicated physical channel resources to the Node B, and meanwhile requests the Node B to configure the other resources associated with the HSDPA for the user equipment. The RNC can send a request process in a Radio Link Setup process, a Synchronised Radio Link Reconfiguration Preparation process or an Asynchronised Radio Link Reconfiguration process in the NBAP protocol to the Node B through the Iub interface to complete the step.

When the RNC configures the carrier resources of the associated dedicated physical channel resources for a certain UE, the condition of the available physical channel resources not configured at the carrier is needed to be considered at least.

Figure 5B:
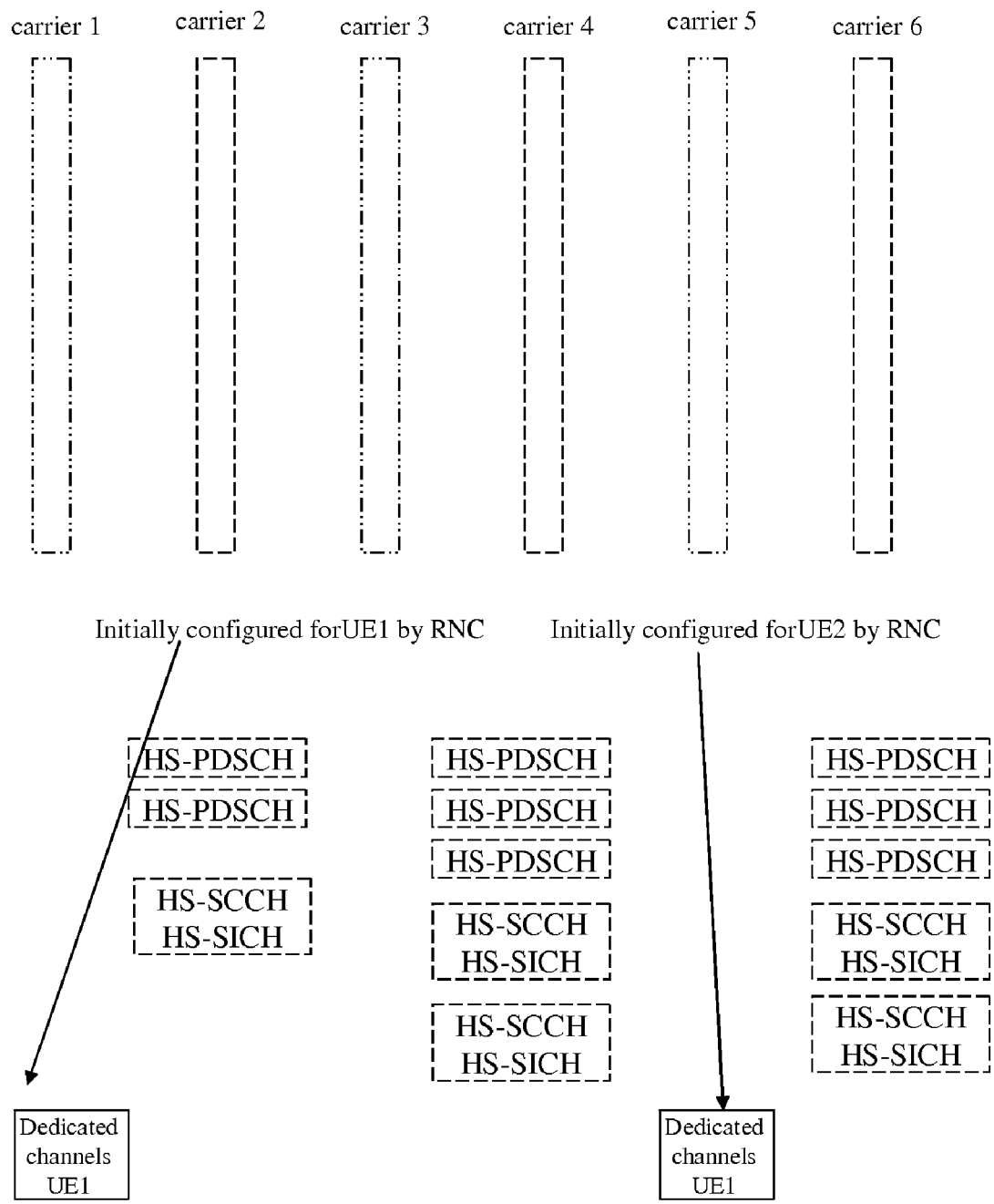
FIG. 5B schematically shows the RNC configures the dedicated physical channel according to the fifth embodiment of the present invention.

As shown in FIG. 5B, the dedicated associated physical channels are respectively configured for the UE1 and the UE2 at the carrier 1 and carrier 5 selected.

3) When the Node B initially configures the HSDPA resources for a certain user equipment, the Node B configures one or plural HS-PDSCH physical channel carrier resources for the user equipment. Meanwhile, for the HS-PDSCH physical channel resources at each configured carrier, one or plural HS-SCCH and HS-SICH physical channel pairs are configured at one or plural carriers, to be associated.

When the Node B configures the HS-PDSCH physical channel carrier resources and the HS-SCCH and HS-SICH physical channel pair resources, the factors to be considered comprise at least: the multi-carrier ability information of the user equipment, the service feature information, and the configuration and use condition of the HS-PDSCH physical channel resources and HS-SCCH and HS-SICH physical channel pair resources at each carrier. The first two kinds of information is provided by the RNC in the associated resources request information; and the last information is provided by the Node B itself, for the Node B is in charge of managing the configuration of the associated resources.

The Node then sends the configuration result of the HS-PDSCH physical channel carrier resources and the HS-SCCH and HS-SICH physical channel pair resources to the RNC.

Figure 5C:
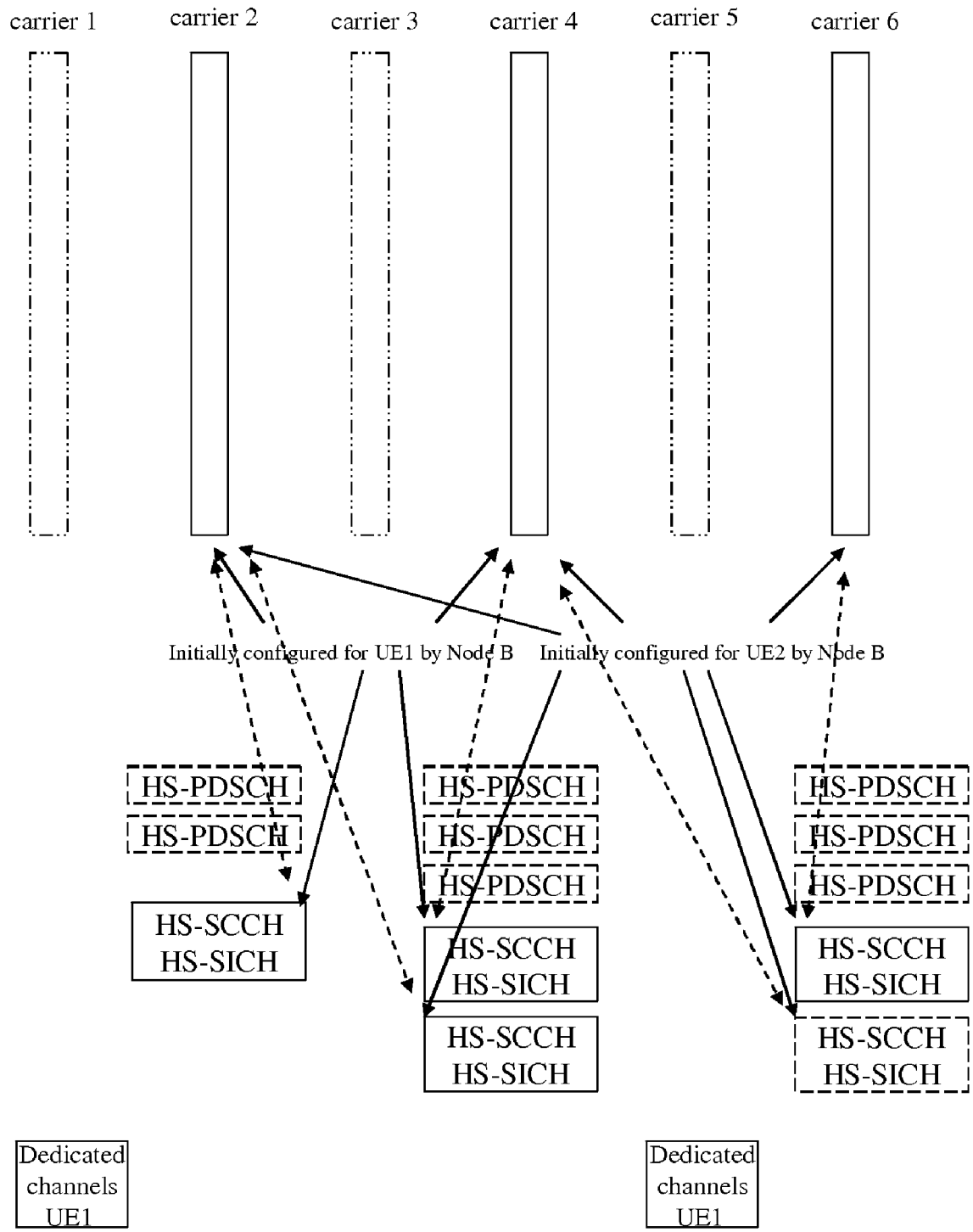
FIG. 5C schematically shows the Node B initially configures the HS-PDSCH physical channel carrier resources, the SCCH and SICH physical channel pair, and the association relations according to the fifth embodiment of the present invention.

As shown in FIG. 5C, the Node B configures two HS-PDSCH carrier resources at the carrier 2 and the carrier 4 for the UE1. Two HS-SCCH and HS-SICH physical channel pairs, respectively associated with the HS-PDSCH carrier resources at the carrier 2 and carrier 4 are configured at the carrier 2 and the carrier 4 at the same time. The Node B configures three HS-PDSCH carrier resources at the carrier 2, the carrier 4 and the carrier 6 for the UE2. Three HS-SCCH and HS-SICH physical channel pairs, respectively associated with the HS-PDSCH carrier resources at the carrier 2, the carrier 4 and carrier 6 are configured at the carrier 2 and the carrier 6 at the same time.

Figure 5D:
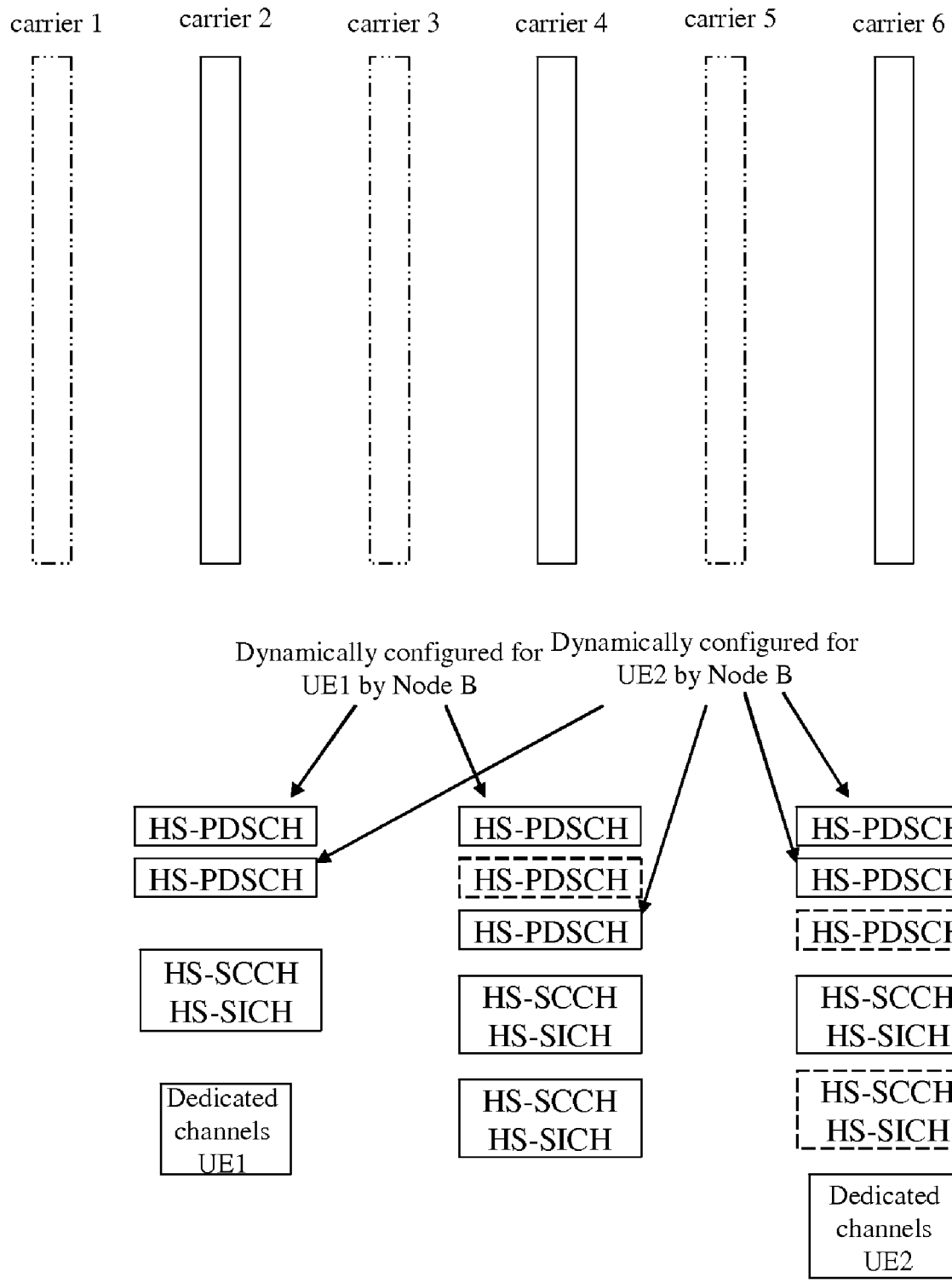
FIG. 5D schematically shows the Node B dynamically configures the HS-PDSCH physical channel resources for the UE according to the fifth embodiment of the present invention.

In this way, when the Node B dynamically configures the HS-PDSCH physical channel resources for the UE, the configuration condition is as shown in FIG. 5D, wherein the real line frame represents the configured channels and carriers (except the dedicated channel carriers), the dashed line frame represents the configured channels and carriers (except the dedicated channel carriers), and the double-point lineation frame represents the carriers not configured with the HSDPA resources.

After all the steps in the above various solutions are completed, the RNC sends the HS-PDSCH physical channel carrier resources, the associated HS-SCCH and HS-SICH physical channel pair resources and the associated dedicated physical channel resources, which are initially configured for the user equipments and sent to the RNC by the Node B to the user equipments by associated processes in the RRC protocol of the Uu interface. These processes comprise a RRC connection establishment process, a radio bearer establishment process, a radio bearer reconfiguration process, a radio bearer release process, a transport channel reconfiguration process, a physical channel reconfiguration process, a cell update process and etc.

When sending the HS-DSCH service data, the Node B dynamically configures the HSDPA resources. The HS-PDSCH time slot and code channel resources are dynamically configured in real time at the initially configured carriers through the HS-SCCH and HS-SICH physical channel pairs. The MAC-hs entity in the Node B selects the HS-PDSCH physical channel resources which configure the above initial configuration at one or plural carriers of one or plural carriers for the user equipments according to the condition of the HS-DSCH service data flow of the user equipments and the condition of the HSDPA resources at plural carriers of the present cell. For each of the selected carrier, an HS-SCCH and HS-SICH physical channel pair is configured from one or plural initially configured HS-SCCH and HS-SICH physical channel pair resources associated with the carrier to bear the configuration control information associated with the HS-PDSCH physical channels at the carrier and receive the feedback information.

Please refer to FIGS. 1D, 2D, 3D, 4D and 5D illustrating the dynamic configuration process.

A user equipment searches and receives the corresponding HS-SCCH channels, and receives the HS-PDSCH physical channels at the associated carriers according to each piece of configuration control information at the carrier.

Figure 6A:
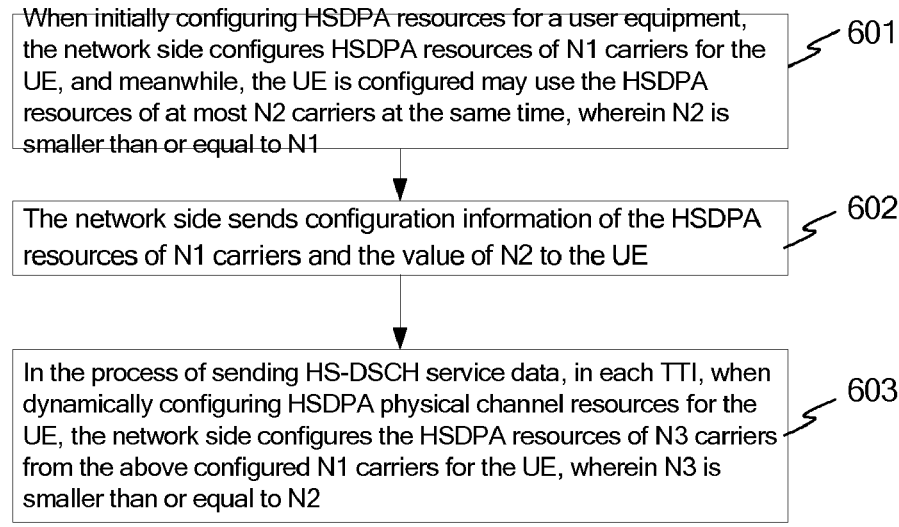
FIG. 6A is a flow chart of the processing method of the carrier resources according to the sixth embodiment of the present invention.

For the HS-PSDCH and the associated HS-SCCH and HS-SICH physical channels at a plurality of carriers, to increase the utilization efficiency and system capacity of the multi-carrier HS-PDSCH physical channel, the present invention provides a method for configuring the carrier resources in the multi-carrier high speed downlink packet access. Please refer to FIG. 6A, which is a flow chart of the carrier resources processing method in the solution (the sixth solution) of the present invention. The configuration and dispatching method of the carrier resources in the multi-carrier HSDPA technology provided in the present invention is adapted in the radio communication system, which comprises a network side of the radio system and a user equipment connected with the network side in communication. The radio communication system can be WCDMA, TD-CDMA, TD-SCDMA or other radio communication systems at present and in the future. In the following, the TD-SCDMA radio communication system is taken as an example to illustrate. The TD-SCDMA radio communication system comprises a radio network controller in the network side, with which a Node B is connected, a user equipment connected with the network side. The method comprises the following steps:

In step 601, the RNC (Radio Network Controller) and the Node B in the network side initially configure the HSDPA resources for the user equipment, wherein the Node B configures the HSDPA resources of N1 carriers for a UE, configures the UE may use the HSDPA resources of at most N2 carriers at the same time, wherein N2 is smaller than or equal to N1, and sends the result information of the resources configuration to the RNC;

In step 602, the RNC in the network side sends the configuration information of the HSDPA resources of N1 carriers and the value of N2 to the UE; and In step 603, in the process of sending the HS-DSCH service data, in each TTI, when the Node B in the network side dynamically configures the HSDPA physical channel resources for the UE, the HSDPA resources of N3 carriers from the above configured N1 carriers are configured for the UE, wherein N3 is smaller than or equal to N2.

There is no strict time sequence in the above steps 601, 602 and 603.

Figure 6B:
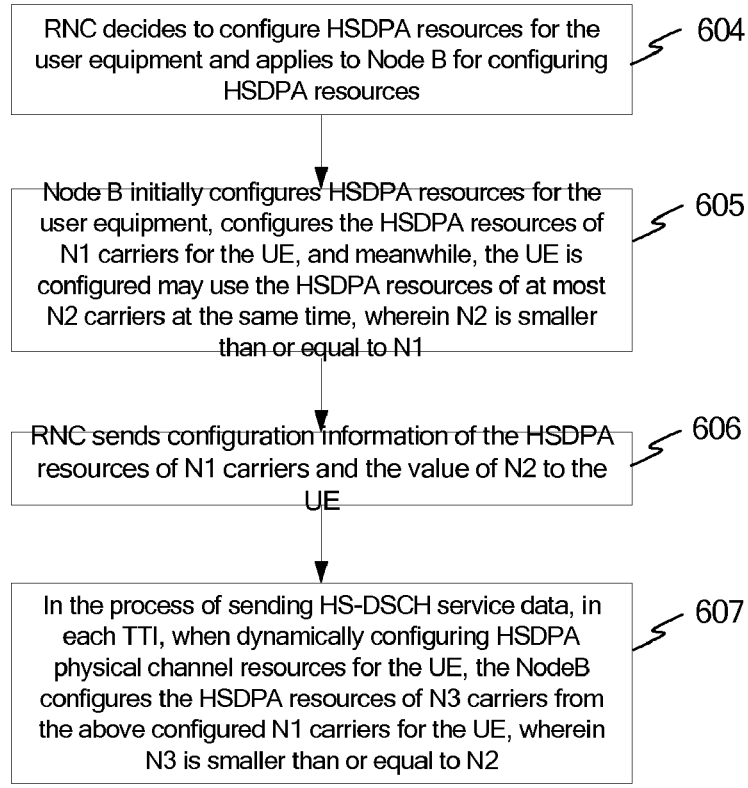
FIG. 6B schematically shows the flow parts of the configuration and dispatching of the HSDPA resources according to the sixth embodiment of the present invention.

FIG. 6B schematically shows the flow chart of configuration and dispatching of the HSDPA resources in the solution of the present method, wherein when the user equipment transmits a service and is configured with the HSDPA resources, the flow parts of the configuration and dispatching of the HSDPA resources comprise:

In step 604, first, the RNC determines to configure the HSDPA resources for the user equipment and applies to the Node B for configuring the HSDPA resources;

The RNC transmits a Radio Link Setup process, a Synchronized Radio Link Reconfiguration Preparation process or an Asynchronised Radio Link Reconfiguration process in the NBAP (Node B Application Protocol) protocol to the Node B through the Iub interface. In the information of "RADIO LINK SETUP REQUEST", "RADIO LINK RECONFIGURATION PREPARE" and "RADIO LINK RECONFIGURATION REQUEST", the Node B is indicated to configure the HSDPA resources, which at least comprise the characteristic information of the user equipment service and the ability information of the multi-carrier HSDPA of the UE, i.e. the QoS (Quality of Service) characteristic of the HS-DSCH service data flow and the number M of the most carriers of the HSDPA resources which the UE can receive and/or send at the same time to the user equipment by a given information unit. The Iub interface is an interface between the RNC and the Node B used to transmit the signaling and data between the RNC and the Node B.

In step 605, the Node B initially configures the HSDPA resources for the user equipment, configures the HSDPA resources of N1 carriers for the UE, and configures the UE may use the HSDPA resources of at most N2 carriers at the same time, wherein N2 is smaller than or equal to N1;

After the Node B receives the above information, the MAC-hs entity therein can configure the HSDPA resources of N1 carriers for the UE according to the multi-carrier HSDPA ability information and resources dispatching demand of the UE, wherein N1 is smaller than or equal to M, and the HSDPA resources comprise N1 carrier resources and one or plural HS-SCCH and HS-SICH physical channels in the HS-SCCH subset associated with the HS-PDSCH physical channel resources of each carrier. Meanwhile, according to the characteristic information of the user equipment service, the UE is configured may use the HSDPA resources of at most N2 carriers at the same time, wherein N2 is smaller than or equal to N1.

After completing the above resources configuration (allocation) associated with the multi-carrier HSDPA technology, in the information of "RADIO LINK SETUP RESPONSE", "RADIO LINK RECONFIGURATION READY" and "RADIO LINK RECONFIGURATION RESPONSE" sent by the Node B to the RNC, the Node B sends the configuration information of the above HSDPA resources of N1 carriers and the value of N2 to the RNC.

In step 606, the RNC sends the configuration information of the HSDPA resources of N1 carriers and the value of N2 to the UE;

After receiving the configuration information of the HSDPA resources of N1 carriers and the value of N2 sent to the UE and fed back by the Node B, the RNC sends these information through the associated processes in the RRC (Radio Resource Control) protocol of the Uu interface, which comprise a Radio Connection Establishment process, a Radio Bearer Establishment process, a Radio Bearer Reconfiguration process, a Radio Bearer Release process, a Transport Channel Reconfiguration process, a Physical Channel Reconfiguration process and a Cell Update process of the RRC to the UE, wherein the Uu interface is an interface between a mobile terminal and the network side and is the most important interface in the radio communication system.

In step 607, in the process of sending the HS-DSCH service data, in each TTI, when the Node B dynamically configures the HSDPA physical channel resources for the UE, the HSDPA resources of N3 carriers from the above configured N1 carriers are configured for the UE, wherein N3 is smaller than or equal to N2;

In the Node B of the network side, in the unit of TTI (in the TD-SCDMA system, TTI is 5 ms), according to the received HS-DSCH service data traffic of each user equipment service, the priority of each UE, the priority of the user equipment service, the condition of the HSDPA resources at N1 carriers configured for each UE, and the feedback information of the receiving condition of the HS-DSCH service data by the user equipment in Transmission Time Interval sent by the user equipment through the HS-SICH channel, the HSDPA resources of N3 carriers from the N1 carriers configured for the UE are configured for the UE, wherein N3 is smaller than or equal to N2. It is further considered that the Node B determines the HS-PDSCH physical channel resources at each carrier of the N3 carriers according to the above HS-DSCH service data traffic, priorities, the HSDPA resources condition and the feedback information of the receiving condition of the HS-DSCH service data. For the N3 carriers, the Node B selects an HS-SCCH channel from the HS-SCCH subset associated with each carrier, in which the configuration information of the above HS-PDSCH physical channel resources is sent to the UE.

In the UE side, in each TTI, the HS-SCCH subsets associated with each carrier of the N1 carriers configured for the UE in the network side are searched. For each HS-SCCH subset, the UE searches all the HS-SCCH channels through "UE identifications" and compares the "UE identifications" itself with those at all the HS-SCCH channels, until in a certain TTI an HS-SCCH channel actually configured for the UE is found, then the next TTI begins. The UE continues only monitoring and receiving the HS-SCCH channel, receiving the associated HS-PDSCH channels at the carriers by using the bearing configuration information, and sending the feedback information of the receiving condition of the HS-DSCH service data in an HS-SICH channel corresponding to the HS-SCCH, until in a certain TTI, the UE can not read the "UE identifications" that match it or can not receive the HS-SCCH in the HS-SCCH channel, then the UE continuously monitors the HS-SCCH subset again and repeat the above process. When the HSDPA resources are configured for the UE at N3 carriers, the UE will find out N3 HS-SCCH channels respectively associated with it. If the number N3 of all the HS-SCCH channels actually configured for the UE found by the UE is equal to N2, i.e. when the HSDPA resources are configured for the UE at N2 carriers, the UE stops searching the HS-SCCH subsets associated with the additional (N1 -N2) carriers.

Figure 6C:
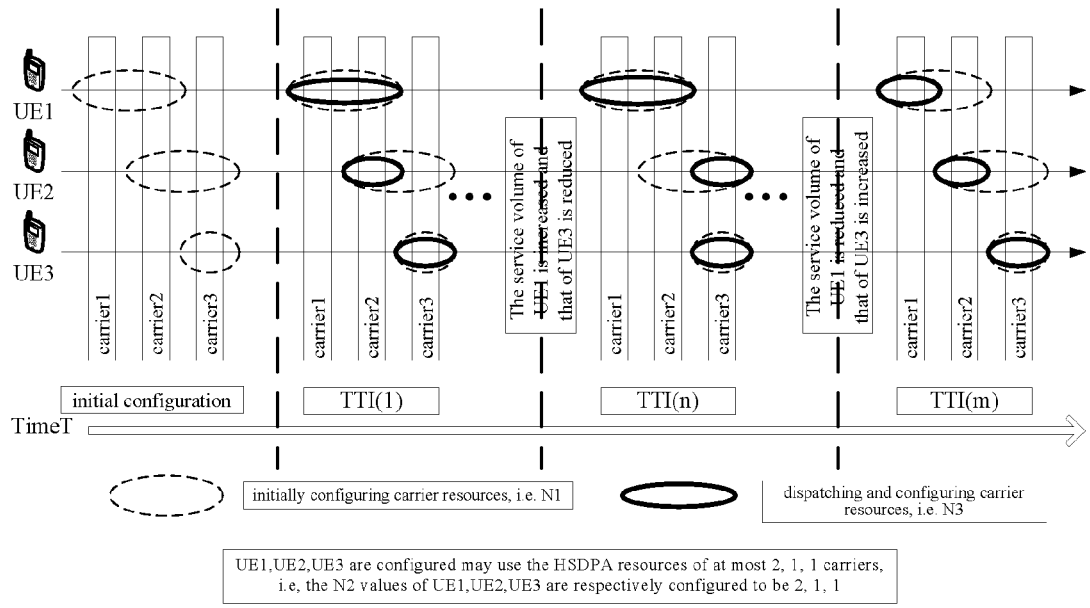
FIG. 6C schematically shows the HSDPA carrier resources of plural UEs are dynamically dispatched in the network side according to the sixth embodiment of the present invention.

FIG. 6C schematically shows the solution of the present method of dynamically dispatching the HSDPA carrier resources of plural UEs in the network side. For the network side, the HSDPA carrier resources of each UE can be dynamically dispatched through the above processes.

The network configures the HSDPA resources of three carriers in a cell: carrier 1, carrier 2 and carrier 3;

There are three UEs in the cell: UE1, UE2 and UE3, which are respectively configured with the HSDPA resources;

The HSDPA resources of the initially configured carriers respectively are:

UE1: N1=2, N2=2, 2(N1) carriers, which are respectively carriers 1 and carriers 2

UE2: N1=2, N2=1, 2(N1) carriers, which are respectively carriers 2 and carriers 3

UE3: N1=1, N2=1, 1(N1) carriers, which are respectively carriers 3

In the process of sending the HS-DSCH service data:

In the beginning, i.e. in the first TTI, the carrier resources dynamically configured for the UE1, the UE2 and the UE3 by the Node B in the network side respectively are:

UE1: N3=2, 2(N3) carriers, which are respectively carriers 1 and carriers 2

UE2: N3=1, 1(N3) carriers, which are respectively carriers 2

UE3: N3=1, 1(N3) carriers, which are respectively carriers 3

In the nth TTI, the service volume of the UE1 is increased and that of the UE3 is reduced, the carrier resources dynamically configured for the UE1, UE2 and UE3 by the Node B in the network side respectively are:

UE1: N3=2, 2(N3) carriers, which are respectively carriers 1 and carriers 2

UE2: N3=1, 1(N3) carriers, which are respectively carriers 3

UE3: N3=1, 1(N3) carriers, which are respectively carriers 3

In the mth TTI, the service volume of the UE1 is reduced and that of the UE3 is increased, the carrier resources dynamically configured for the UE1, UE2 and UE3 by the Node B in the network side respectively are:

UE1: N3=1, 1(N3) carriers, which are respectively carriers 1

UE2: N3=1, 1(N3) carriers, which are respectively carriers 2

UE3: N3=1, 1(N3) carriers, which are respectively carriers 3

By the above dynamic dispatching method, the Node B of the network side can dispatch plural HSDPA carrier resources for each UE in real time according to changes of different UE services so as to realize the carrier load balance and increase the system capacity.

In the solution of the multi-carrier HSDPA system, the radio access system of the network side comprises a Radio Network Controller (RNC) and a Node B. Before performing the processing method of carrier resources said in FIGS. 1, 2 and 3 of the present invention, the network side configures the HSDPA resources at plural carriers in an N frequency points cell, which comprise the HS-PDSCH channel resources at plural carriers and plural HS-SCCH and HS-SICH channel resources and sets up an MAC-hs entity in the Node B to manage the above HSDPA physical channel resources.

The processing method of the carrier resources in the multi-carrier HSDPA technology provided by the solution of the present method greatly increases the utilization efficiency of the multi-carrier HS-PDSCH physical channels so that the system capacity is increased.

Figure 7A:
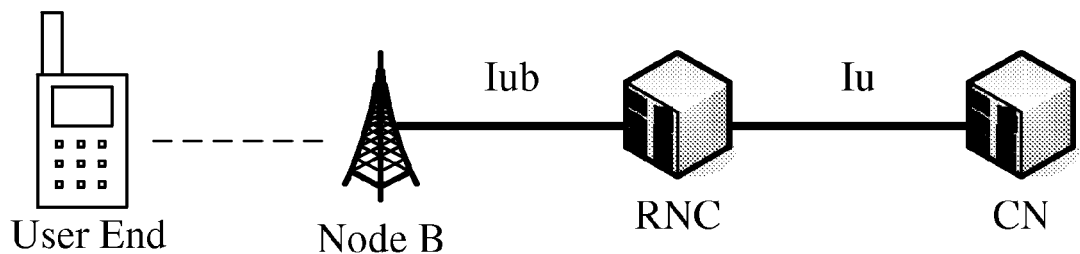
FIG. 7A schematically shows the network structure of the UMTS system according to the seventh embodiment of the present invention.

In order that a base station can properly configure the HSDPA carrier resources for each UE in the process of initially configuring the carrier resources, the present invention also provides a method of configuring carrier resources for the multi-carrier high speed downlink packet access. FIG. 7A schematically shows the network structure of the UMTS system of the solution (i.e. the seventh solution) of the present method. As shown in FIG. 7A, the 3G system is composed of a CN (core net), an RAN (radio access net) and a user equipment, wherein the core net CN is connected with the RNC (radio network controller) of the radio access net through an Iu interface and the RNC is connected with the Node B through an Iub interface. One or plural carriers are configured between the user equipment and the Node B, and each carrier is configured with one or plural high speed downlink shared channels HS-PDSCH and one or plural corresponding high speed shared control channels HS-SCCH, high speed shared information channels HS-SICH.

Figure 7B:
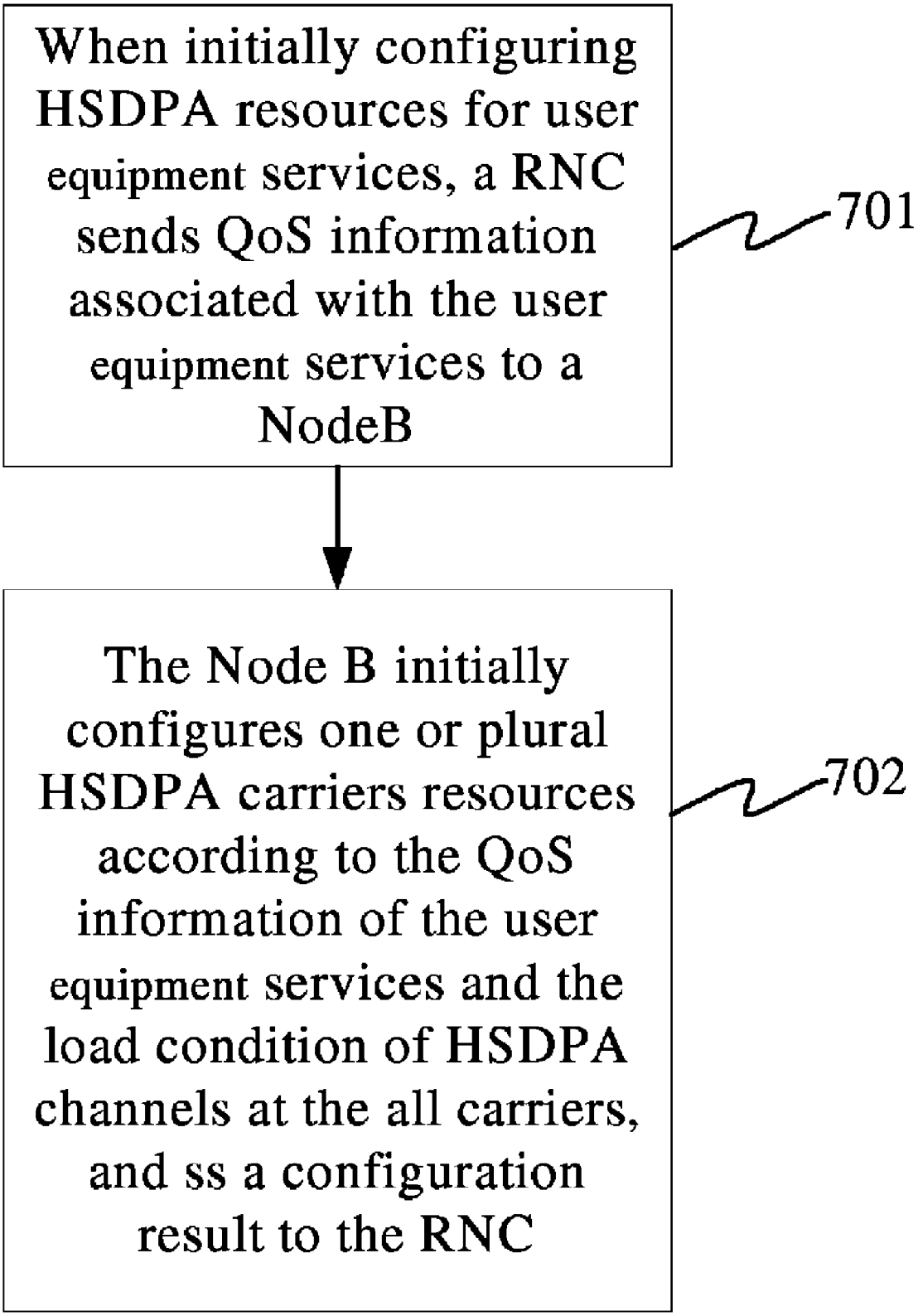
FIG. 7B is a flow chart of a method for configuring the radio resources in the multi-carrier high speed downlink packet access technology according to the seventh embodiment of the present invention.

Referring to the flow chart of FIG. 7B, the method of initially configuring the HSDPA carrier resources of the solution of the present method comprises the following steps:

A certain user equipment transmits a request of a certain service and the RNC receives the request and is in charge of configuring the HSDPA resources for the request. Here, the RNC sends the QoS (quality of service) information associated with the service transmitted by the user equipment and the necessary information of setting up a call channel existing in the present technology (not described here in detail) to the Node B (step 701) and requests the Node B to configure associated resources of HSDPA for the user equipment.

Wherein, the process of sending the Qos information to the Node B can be achieved by a plurality of forms, for example: The RNC can send a request process in a Radio Link Setup process, a Synchronised Radio Link Reconfiguration Preparation process or an Asynchronised Radio Link Reconfiguration process in the NBAP protocol to the Node B through the Iub interface.

Additionally, for the origin of the QoS information, the RNC can obtain the QoS information from the information associated with the service transmitted by the user equipment and sent by the received core net nodes, which comprise MSC (mobile switch center) or SGSN (service GPRS support node). The information associated with the service transmitted by the user equipment comprises information of RAB ASSIGNMENT REQUEST, RELOCATION REQUEST, and RAB MODIFY REQUEST in the RANAP protocol of the Iu interface.

Wherein, the QoS information comprises a plurality of aspects, however, those associated with the initial configuration of carrier resources mainly comprise: Maximum bit rate and Guaranteed bit rate. Therefore, after receiving the QoS information, the RNC can sends the information of the Maximum bit rate and Guaranteed bit rate of the service to the Node B. Certainly, the RNC can also conduct a comprehensive processing to the two parameters, for example according to the following formula the comprehensive processing renders a comprehensive parameter, which is then sent to the Node B.

$\lambda$*Maximum bit rate+$(1-\lambda)$*Guaranteed bit rate, wherein $\lambda$ is a weight factor, whose scope of values is $0 \leq \lambda \leq 1$.

In the HSDPA resources configuring request message sent by the RNC to the Node B, if plural services are included, the RNC needs conducting comprehensive process to the QoS parameters of the plural services, for example the Maximum bit rate of the plural services is directly added to the Guaranteed bit rate thereof, which renders a summation that is then sent to the Node B.

After receiving the HSDPA resources configuring request information sent by the RNC, the Node B initially configures one or plural HSDPA carriers satisfying the request of the QoS information for the request, referring to the parameter information of the QoS and the load condition of the HSDPA channels at all the carriers monitored by the Node B, wherein each carrier has a high speed downlink shared channel HS-PDSCH and is configured with one or plural HS-SCCH and HS-SICH physical channel pair resources to be associated with the carrier and other associated HSDPA resources. Subsequently, the Node B sends the configuration result of the HSDPA resources to the RNC (step 702). The initial configuration of the HSDPA carrier resources is finished.

The 128 k PS field service is taken as an example. When the terminal and network decide by negotiation to configure a 128 k PS field service for the terminal, the core net sends an RAB (radio access bearer) setup request to the RNC, wherein the Maximum bit rate of the service is 128 k and the Guaranteed bit rate thereof is 0. The RNC decides to configure the HSDPA resources for the service and transmits an HSDPA resources configuration request to the Node B in the radio link setup/reconfiguration information, wherein the QoS information of the service is included: the Maximum bit rate is 128 k and the Guaranteed bit rate is 0. The Node B, according to the QoS information decides to configure two carrier resources at the carrier 2 and carrier 3 for the service (the system is configured with the HSDPA resources at three carriers of the three carrier cells) and at the same time, respectively configure two pairs of HS-SCCH and HS-SICH physical channel pair resources at the carrier 2 for two carrier resources.

The advantage of the solution of the present method lies in that the RNC sends the QoS information associated with the requested service, which is used as an important foundation when the Node B conducts the initial configuration of the HSDPA carrier resources to the Node B, and consequently the initial configuration of carrier resources of the Node B is optimized.

The above is only preferred embodiments of the present invention, which are not used to confine the present invention. For those skilled in the art, the present invention can have various modifications and variations. Any amendments, equivalent substitutions, improvements etc. within the spirit and principle of the present invention should be included in the scope of protection of the present invention.

The invention claimed is:

1. A method for configuring channel resources for multi-carrier high speed downlink packet access, comprising:
   a radio network controller configuring high speed physical downlink shared channel resources at one or plural carriers in a multi-carrier cell and only configuring one or plural high speed shared control channel and high speed shared information channel pairs resources at the each carrier configured with the high speed physical downlink shared channel resources;

the radio network controller recording initial configuration information of the high speed physical downlink shared channel resources at the each carrier, and recording configuration information of the high speed physical downlink shared channel resources at the each carrier in real time;

according to the information recorded, when initially configuring high speed downlink packet access resources for a user equipment, the radio network controller configuring associated dedicated physical channel resources at a carrier at which the high speed physical downlink shared channel resources are configured, and sending configuration information of the associated dedicated physical channel resources comprising carrier information to a Node B;

when initially configuring the high speed downlink packet access resources for a user equipment, the Node B configuring one or plural high speed physical downlink shared channel carrier resources, wherein the carrier where the associated dedicated physical channel is located must be included, meanwhile, to be associated to the high speed physical downlink shared channel resources at the each configured carrier, configuring the one or plural high speed shared control channel and high speed shared information channel pairs at the same carrier and sending the configuration result to the radio network controller;

wherein when the radio network controller configures associated dedicated physical channel resources, factors needed to be considered comprise;

(1) the condition of available physical channel resources which are not configured at the carriers;

(2) the load condition of the high speed downlink packet access resources at the carriers.

2. As the method for configuring channel resources in claim 1, characterized in the step of the radio network controller recording configuration information of the high speed physical downlink shared channel resources at the each carrier in real time, the configuration information being recorded according to the configuration result information sent by the Node B to the radio network controller.

3. As the method for configuring channel resources in claim 2, characterized in the step of the radio network controller recording configuration information of the high speed physical downlink shared channel resources at the each carrier in real time further comprising:

recording the number of the user equipments for which the high speed physical downlink shared channel carrier resources are configured at the each carrier in real time; and estimating the load condition of the high speed downlink packet access resources at the each carrier according to the number of the user equipments.

4. As the method for configuring channel resources in claim 1, characterized in when the Node B configures the high speed physical downlink shared channel resources and the associated high speed shared control channel and high speed shared information channel pairs resources, factors needed to be considered comprising: carriers where the associated dedicated physical channels are located, multi-carrier ability information of the user equipments, service feature information, and the configuration and use condition of the high speed downlink packet access resources at each carrier.

5. A method for configuring channel resources for multi-carrier high speed downlink packet access, comprising:

a radio network controller configuring high speed physical downlink shared channel resources at one or plural carriers in a multi-carrier cell and only configuring one or plural high speed shared control channel and high speed shared information channel pairs resources at each carrier configured with the high speed physical downlink shared channel resources;

when initially configuring the high speed downlink packet access resources for a user equipment, the radio network controller selects one carrier, at which associated dedicated physical channel resources are configuring from all carriers in the multi-carrier cell;

when initially configuring the high speed downlink packet access resources for a user equipment, a Node B configures one or plural high speed physical downlink shared channel carrier resources, meanwhile, to be associated to the high speed physical downlink shared channel resources at the each configured carrier, configuring the one or plural high speed shared control channel and high speed shared information channel pairs at the same carrier;

wherein when the radio network controller selects one carrier at which associated dedicated physical channel resources are configured, a factor needed to be considered comprises: the condition of available physical channel resources which are not configured at the carriers.

6. As the method for configuring channel resources in claim 5, characterized in when the Node B configures the high speed physical downlink shared channel resources and the associated high speed shared control channel and high speed shared information channel pairs resources, factors needed to be considered comprising: multi-carrier ability information of user equipments, service feature information, and the configuration and use condition of the high speed downlink packet access resources at the each carrier.

7. As the method for configuring channel resources in claim 5, characterized in the step of the radio network controller configuring the associated dedicated physical channel resources further comprising: sending configuration information of associated dedicated physical channel resources comprising carrier information to the Node B;

the step of the Node B configuring the high speed physical downlink shared channel resources and the associated high speed shared control channel and high speed shared information channel pairs resources further comprising: sending the configuration result to the radio network controller.

8. A method for configuring channel resources for multi-carrier high speed downlink packet access, comprising:

a radio network controller configuring high speed physical downlink shared channel resources at one or plural carriers in a multi-carrier cell and configuring one or plural high speed shared control channel and high speed shared information channel pairs resources at the one or plural carriers;

the radio network controller recording initial configuration information of the high speed physical downlink shared channel resources, the high speed shared control channel and high speed shared information channel pairs resources at the each carrier, and recording configuration information of the high speed physical downlink shared channel resources, the high speed shared control channel and high speed shared information channel pair resources at each carrier in real time;

according to the information recorded, when initially configuring the high speed downlink packet access resources for a user equipment, the radio network controller configuring associated dedicated physical channel resources at the carrier which is configured with the high speed shared control channel and high speed shared information channel pair resources and sending configuration information of the associated dedicated physical channel resources comprising carrier information to a Node B;

when initially configuring the high speed downlink packet access resources for a user equipment, the Node B configuring the one or plural high speed physical downlink shared channel carrier resources, meanwhile, to be associated to the high speed physical downlink shared channel resources at the each configured carrier, configuring the one or plural high speed shared control channel and high speed shared information channel pairs resources at the carrier where an associated dedicated physical channel is located, and sending a configuration result of the high speed physical downlink shared channel carrier resources and the high speed shared control channel and high speed shared information channel pairs resources to the radio network controller;

when the radio network controller configures associated dedicated physical channel resources, factors needed to be considered comprise:

(1) the condition of available physical channel resources which are not configured at the carriers;

(2) the load condition of the each high speed shared control channel and high speed shared information channel pair resources at the carriers;

(3) the load condition of the high speed physical downlink shared channel resources at the carriers.

9. As the method for configuring channel resources in claim 8, characterized in the step of the radio network controller recording of the high speed physical downlink shared channel resources, the high speed shared control channel and high speed shared information channel pairs resources at each carrier in real time, the configuration information being recorded according to the configuration result information sent by the Node B to the radio network controller.

10. As the method for configuring channel resources in claim 9, characterized in the step of the radio network controller recording configuration information of the high speed physical downlink shared channel resources, the high speed shared control channel and high speed shared information channel pair resources at the each carrier in real time further comprising:

recording the number of user equipments for which the high speed physical downlink shared channel resources are configured at the each carrier and the number of user equipments are configured with the high speed shared control channel and high speed shared information channel pair at the each carrier in real time; and estimating the load condition of the high speed physical downlink shared channels, and the high speed shared control channel and high speed shared information channel pair resources at the carrier according to the number of user equipments.

11. As the method for configuring channels in claim 8, characterized in when the Node B configures the high speed physical downlink shared channel resources and the associated high speed shared control channel and high speed shared information channel pair resources, factors needed to be considered comprising: which carriers the associated dedicated physical channels are located, multi-carrier ability information of user equipments, service feature information, and the configuration and use condition of the high speed downlink packet access resources at the each carrier.

12. A method for configuring channels for multi-carrier high speed downlink packet access, comprising:

a radio network controller configuring high speed physical downlink shared channel resources at one or plural carriers in a multi-carrier cell and configuring one or plural high speed shared control channel and high speed shared information channel pairs resources at one or plural carriers;

the radio network controller recording initial configuration information of the high speed physical downlink shared channel resources, the high speed shared control channel and high speed shared information channel pair resources at the each carrier, and recording configuration information of the high speed physical downlink shared channel resources, the high speed shared control channel and high speed shared information channel pair resources at the each carrier in real time;

according to the information recorded, when initially configuring high speed downlink packet access resources for a user equipment, the radio network controller configuring associated dedicated physical channel resources at a carrier at which the high speed shared control channel and high speed shared information channel pair resources are configured, and sending configuration information of the associated dedicated physical channel resources comprising carrier information to a Node B;

when initially configuring the high speed downlink packet access resources for a user equipment, the Node B configuring one or plural high speed physical downlink shared channel carrier resources, meanwhile, to be associated to the high speed physical downlink shared channel resources at the each configured carrier, configuring the one or plural high speed shared control channel and high speed shared information channel pairs at one or plural carriers which must include the carrier where the associated dedicated physical channel is located, and sending a configuration result of the high speed physical downlink shared channel carrier resources and the high speed shared control channel and high speed shared information channel pairs resources to the radio network controller;

wherein when the radio network controller configures associated dedicated physical channel resources, factors considered at least comprise:

(1) the condition of available physical channel resources which are not configured at the carriers;

(2) the load condition of the high speed shared control channel and high speed shared information channel pair resources at the carriers;

(3) the load condition of the high speed physical downlink shared channel resources at the carriers.

13. As the method for configuring channel resources in claim 12, characterized in the step of the radio network controller recording configuration information of the high speed shared control channel and high speed shared information channel pair resources at the each carrier in real time, the configuration information being recorded according to the configuration result information sent by the Node B to the radio network controller.

14. As the method for configuring channel resources in claim 13, characterized in the step of he radio network controller recording configuration information of the high speed shared control channel and high speed shared information channel pair resources at the each carrier in real time further comprising:

recording the number of user equipments for which the high speed physical downlink shared channel resources are configured at the each carrier and the number of user equipments are configured with the high speed shared control channel and high speed shared information channel pair at the each carrier in real time; and estimating the load condition of the high speed physical downlink shared channels resources, and the high speed shared control channel and high speed shared information channel pair resources at the carrier according to the number of user equipments.

15. As the method for configuring channel resources in claim 12, characterized in when the Node B configures the high speed physical downlink shared channel resources and the associated high speed shared control channel and high speed shared information channel pair resources, factors needed to be considered comprising:

which carriers the associated dedicated physical channels are located, multi-carrier ability information of user equipments, service feature information, and the configuration and use condition of the high speed downlink packet access resources at the each carrier.

16. A method for configuring channel resources for multi-carrier high speed downlink packet access, comprising:

a radio network controller configuring high speed physical downlink shared channel resources at one or plural carriers in a multi-carrier cell and configuring one or plural high speed shared control channels and high speed shared information channel pairs resources at one or plural carriers;

when initially configuring the high speed downlink packet access resources for a user equipment, the radio network controller selecting one carrier, at which associated dedicated physical channel resources are configured from all carriers in a multi-carrier cell;

when initially configuring the high speed downlink packet access resources for a user equipment, a Node B configuring one or plural high speed physical downlink shared channel carrier resources, meanwhile, to be associated to the high speed physical downlink shared channel resources at the each configured carrier, configuring the one or plural high speed shared control channel and high speed shared information channel pairs at one or plural carriers;

wherein when the radio network controller selects one carrier on which associated dedicated physical channel resources are configured, a factor needed to be considered comprises: the condition of available physical channel resources which are not configured at the carriers.

17. As the method in claim 16, characterized in when the Node B configures the high speed physical downlink shared channel resources and the associated high speed shared control channel and high speed shared information channel pair resources, factors can be considered at least comprising: multi-carrier ability information of user equipments, service feature information, and the configuration and use condition of the high speed downlink packet access resources at the each carrier.

18. As the method for configuring channel resources in claim 16, characterized in the step of the radio network controller configuring the associated dedicated physical channel resources further comprising: sending configuration information of associated dedicated physical channel resources comprising carrier information to the Node B;

the steps of the Node B configuring the high speed physical downlink shared channel resources and the associated high speed shared control channel and high speed shared information channel pair resources further comprising: sending the configuration result to the radio network controller.

19. A method for configuring carrier resources for multi-carrier high speed downlink packet access, comprising:

when initially configuring high speed downlink packet access resources for a user equipment, a Node B configuring the high speed downlink packet access resources of N1 carriers for the user equipment, and configuring the user equipment can use the high speed downlink packet access resources of not more than N2 carriers at the same time, wherein N2 is smaller than or equal to N1;

a radio network controller sending the configuration information of the high speed downlink packet access resources of N1 carriers and the value of N2 to the user equipment;

and in the process of sending the high speed downlink shared channel service data, in each transmission time interval, the Node B dynamically configuring the high speed downlink packet access resources for the user equipment and configuring the high speed downlink packet access resources of N3 carriers from the N1 carriers for the user equipment, wherein N3 is smaller than or equal to N2;

and further comprising: the radio network controller initiating a Radio Link Setup process, a Synchronised Radio Link Reconfiguration Preparation process and an Asynchronised Radio Link Reconfiguration process based on Node B Application Protocol to the Node B through an Iub interface.

20. According to the method for configuring carrier resources in claim 19, characterized in further comprising: the radio network controller deciding to configure the high speed downlink packet access resources for a user equipment and applying to the Node B for configuring the high speed downlink packet access resources before the step of initially configuring the high speed downlink packet access resources for the user equipment.

21. According to the method for configuring carrier resources in claim 20, characterized in further comprising: sending the configuration information of the high speed downlink packet access resources of N1 carriers and a value of N2 to the radio network controller through RADIO LINK SETUP RESPONSE message, RADIO LINK RECONFIGURATION READY/FINISHMENT message and RADIO LINK RECONFIGURATION RESPONSE message by the Node B after the Node B completes resources configuration.

22. According to the method for configuring carrier resources in claim 19, characterized in further comprising: sending the configuration information of the high speed downlink packet access resources of N1 carriers and a value of N2 to the user equipment through Radio Connection Establishment process, Radio Bearer Establishment process, Radio Bearer Reconfiguration process, Radio Bearer Release process, Transport Channel Reconfiguration process, Physical Channel Reconfiguration process and Cell Update process of a Uu interface based on Radio Resources Control Protocol.

23. According to the method for configuring carrier resources in claim 19, characterized in further comprising:

configuring the high speed downlink packet access resources of N3 carriers from the N1 carriers for a user equipment according to the received service data traffic of the high speed downlink shared channels of user equipment services, the priority of a user equipment, the priority of the user equipment services, the condition of the high speed downlink packet access resources at the N1 carriers configured for a user equipment, and the feedback information to the service data receiving condition of the high speed downlink shared channels in the transmission time interval sent by a user equipment through high speed shared information channel (HS-SICH) channels by the Node B.

24. According to the method for configuring carrier resources in claim 23, characterized in further comprising: determining the physical channel resources of the high speed physical downlink shared channel at each carrier of the N3 carriers according to the service data traffic of the high speed downlink shared channels, priorities, the condition of the high speed downlink packet access resources and the feedback information of the service data receiving condition of the high speed downlink shared channels by the Node B.

25. According to the method for configuring carrier resources in claim 24, characterized in further comprising: selecting a channel of the high speed shared control channel in the subset of the high speed shared control channels associated with each carrier for the N3 carriers, and sending the configuration information of the physical channel resources of the high speed physical downlink shared channels to the user equipment by the Node B.

26. According to the method for configuring carrier resources in claim 25, characterized in further comprising: searching the subset of the high speed shared control channels associated with each carrier of N1 carriers configured for a user equipment by the Node B in each transmission time interval by the user equipment.

27. According to the method for configuring carrier resources in claim 26, characterized in further comprising: searching all channels of the high speed shared control channel and comparing user equipment identifications of the user equipment with those on all channels of the high speed shared control channel through user equipment identifications by the user equipment for the subset of each high speed shared control channel, until a channel of the high speed shared control channel actually configured for the user equipment is found.

28. According to the method for configuring carrier resources in claim 27, characterized in when the high speed downlink packet access resources are configured to the user equipment at N3 carriers, the user equipment will find N3 channels of the high speed shared control channel respectively associated, and when the number N3 of all channels of the high speed shared control channel found by the user equipment and actually configured for the user equipment is equal to N2, the user equipment stops searching the subset of the high speed shared control channels associated with the N1-N2 carriers.

29. A method for configuring carrier resources for multi-carrier high speed downlink packet access, comprising:
step 1, a radio network controller sending a quality of service information associated with services requested by the user equipment to a Node B;
step 2, the Node B initially configuring the high speed downlink packet access carrier resources for this request according to the quality of service information and a load condition of high speed downlink packet access channels at all carriers, and sending a configuration result to the radio network controller;
wherein the step 1 is realized through:
the radio network controller initiating a request processes in a Radio Link Setup process, a Synchronised Radio Link Reconfiguration Preparation process or an Asynchronised Radio Link Reconfiguration process in Node B Application Protocol (NBAP) to the Node B through an Iub interface.

30. According to the method for configuring carrier resources in claim 29, characterized in the step 1 further comprising: the radio network controller obtaining the quality of service information from that associated with the services received by nodes of a core net.

31. According to the method for configuring carrier resources in claim 30, characterized in step 1, the radio network controller obtaining the quality of service information from RAB ASSIGMENT REQUEST information, RELOCATION REQUEST information or RAB MODIFY REQUEST information in RANAP protocol of an Iu interface, wherein RAB refers to radio access bearer.

32. According to the method for configuring carrier resources in claim 30, characterized in nodes of the core net comprising mobile switch center (MSC) and service General Packet Radio Service support node (SGSN).

33. According to the method for configuring carrier resources in claim 29, characterized in the quality of service information comprising Maximum bit rate and Guaranteed bit rate.

34. According to the method for configuring carrier resources in claim 33, characterized in the step 1 further comprising the radio network controller processing the Maximum bit rate and the Guaranteed bit rate to be a comprehensive parameter, and sending it to the Node B.

35. According to the method for configuring carrier resources in claim 33, characterized in the step 1 further comprising when a user requests plural services at the same time, adding a Maximum bit rate of the plural services to the Guaranteed bit rate thereof directly, and sending the summation to the Node B.

36. According to the method for configuring carrier resources in claim 29, characterized in step 2 the step of initially configuring the high speed downlink packet access carrier resources for this request further comprising: initially configuring one or plural high speed downlink packet access carriers satisfying requirements of the quality of service information for this request, and configuring for each carrier one or plural high speed shared control channel and high speed shared information channel pairs associated with the carriers.

37. According to the method for configuring carrier resources in claim 34, characterized in the formula according to which the radio network controller processes the Maximum bit rate and the Guaranteed bit rate is: $\lambda$*Maximum bit rate+$(1-\lambda)$*Guaranteed bit rate, wherein $\lambda$ is a weight factor, whose scope of value is $0 \leq \lambda \leq 1$.

* * * * *